US012442588B2

(12) United States Patent
Lee et al.

(10) Patent No.: US 12,442,588 B2
(45) Date of Patent: Oct. 14, 2025

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/270,824

(22) PCT Filed: Jan. 5, 2022

(86) PCT No.: PCT/KR2022/000143
§ 371 (c)(1),
(2) Date: Jul. 3, 2023

(87) PCT Pub. No.: WO2022/149843
PCT Pub. Date: Jul. 14, 2022

(65) Prior Publication Data

US 2024/0053089 A1 Feb. 15, 2024

(30) Foreign Application Priority Data

Jan. 6, 2021 (KR) ........................ 10-2021-0001444

(51) Int. Cl.
*F25D 23/02* (2006.01)
*E05D 11/00* (2006.01)
*F25D 23/06* (2006.01)

(52) U.S. Cl.
CPC ........ *F25D 23/028* (2013.01); *E05D 11/0054* (2013.01); *E05Y 2900/31* (2013.01);
(Continued)

(58) Field of Classification Search
CPC ............. F25D 23/025; F25D 2323/024; F25D 2400/40; F25D 23/028; F25D 23/02;
(Continued)

(56) References Cited

U.S. PATENT DOCUMENTS 3,848,361 A * 11/1974 Foster .................... H01R 35/02
439/31
5,690,501 A * 11/1997 Mader .................... H01R 35/02
439/165
(Continued)

FOREIGN PATENT DOCUMENTS

CN 101167225 4/2008
CN 105486010 2/2018
(Continued)

OTHER PUBLICATIONS

KR20100054353A translation (Year: 2010).*
(Continued)

*Primary Examiner* — Hiwot E Tefera
(74) *Attorney, Agent, or Firm* — KED & ASSOCIATES, LLP

(57) ABSTRACT

A refrigerator having: a cabinet having a storage space; a refrigerator door that is rotatably connected to the cabinet by means of a hinge device and opens and closes the storage space; an extension member that is drawn out from the cabinet and connected to the inside of the refrigerator door through a door opening spaced apart from the rotation center of the refrigerator door and includes at least one of a wire and a tube through which a liquid flows; a guide housing that guides the extension member positioned on the outside of the cabinet and the refrigerator door and includes a plurality of individual housings rotatably connected to each other;
(Continued)

and a door fixing unit that rotatably connects a first housing among the plurality of individual housings to the refrigerator door.

19 Claims, 23 Drawing Sheets

(52) U.S. Cl.
CPC ...... *F25D 23/068* (2013.01); *F25D 2323/024* (2013.01); *F25D 2400/40* (2013.01)

(58) Field of Classification Search
CPC ............... F25D 23/068; E05Y 2900/31; E05Y 2600/626; E05Y 2900/302; E05Y 2201/10; E05D 7/081; E05D 11/0054; E05D 11/0081; E05D 3/12; F16G 13/16; H02G 11/006
See application file for complete search history.

(56) References Cited

U.S. PATENT DOCUMENTS

| | | | | |
|---|---|---|---|---|
| 6,192,630 | B1 * | 2/2001 | Banicevic | F25D 23/02<br>49/501 |
| 6,350,956 | B1 * | 2/2002 | Sakata | B60R 16/0215<br>174/101 |
| 6,685,253 | B1 * | 2/2004 | Wolcott | B60R 16/0215<br>296/155 |
| 7,576,283 | B2 * | 8/2009 | Kadrnoska | G02B 6/4461<br>174/21 JS |
| 9,328,954 | B2 | 5/2016 | Kang et al. | |
| 9,660,427 | B1 * | 5/2017 | Shah | H01B 7/18 |
| 9,797,205 | B2 * | 10/2017 | Lee | F16L 3/015 |
| 2004/0250525 | A1 * | 12/2004 | Kobayashi | F16G 13/16<br>59/78.1 |
| 2006/0064846 | A1 * | 3/2006 | Espindola | E05D 7/081<br>16/223 |
| 2013/0047656 | A1 | 2/2013 | Kang et al. | |
| 2013/0092802 | A1 * | 4/2013 | Doberstein | D06F 39/14<br>248/70 |
| 2014/0210328 | A1 * | 7/2014 | Akalan | E05D 7/00<br>312/326 |
| 2016/0195325 | A1 | 7/2016 | Kim et al. | |
| 2016/0245579 | A1 * | 8/2016 | Eom | E05F 5/02 |
| 2018/0148962 | A1 * | 5/2018 | Jung | F25D 23/028 |
| 2018/0187956 | A1 * | 7/2018 | Kim | F25D 23/02 |
| 2018/0202706 | A1 * | 7/2018 | Lee | F25D 29/005 |
| 2020/0173712 | A1 * | 6/2020 | Choi | F25D 25/00 |
| 2021/0010745 | A1 * | 1/2021 | Choi | F25D 29/005 |
| 2022/0057133 | A1 * | 2/2022 | Oh | F25D 23/061 |
| 2023/0392425 | A1 * | 12/2023 | Douglas | E05D 11/0081 |

FOREIGN PATENT DOCUMENTS

| | | | | |
|---|---|---|---|---|
| CN | 109959212 | | | 7/2019 |
| CN | 110398121 | A | * | 11/2019 |
| CN | 110130758 | | | 11/2020 |
| EP | 1894789 | | | 10/2011 |
| JP | 2006-168433 | | | 6/2006 |
| JP | 6755402 | | | 9/2020 |
| KR | 10-2007-0121056 | | | 12/2007 |
| KR | 10-2009-0074936 | | | 7/2009 |
| KR | 10-2010-0054353 | | | 5/2010 |
| KR | 10-0988023 | | | 10/2010 |
| KR | 10-2016-0102681 | | | 8/2016 |
| KR | 10-2018-0080032 | | | 7/2018 |
| KR | 20200067415 | A | * | 6/2020 |

OTHER PUBLICATIONS

CN110130758A translation (Year: 2019).*
International Search Report dated Apr. 19, 2022 issued in Application No. PCT/KR2022/000143.
International Search Report dated Apr. 20, 2022 issued in Application No. PCT/KR2022/000245.
International Search Report dated Apr. 20, 2022 issued in Application No. PCT/KR2022/000247.
International Search Report dated Apr. 19, 2022 issued in Application No. PCT/KR2022/000150.
Extended European Search Report dated Oct. 17, 2024 issued in Application No. 22736859.4.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2022/000143, filed Jan. 5, 2022, which claims priority to Korean Patent Application No. 10-2021-0001444, filed Jan. 6, 2021, whose entire disclosures are hereby incorporated by reference.

TECHNICAL FIELD

This specification relates to a refrigerator.

BACKGROUND ART

In general, a refrigerator is a home appliance that stores food at a low temperature in a storage space of an interior shielded by a refrigerator door, and the refrigerator is configured to keep the stored food in an optimal condition by cooling the inside of the storage space using cold air generated through heat exchange with a refrigerant circulating in the refrigeration cycle.

The refrigerator may be independently placed in a kitchen, a living room, or the like, or may be stored in a furniture cabinet of a kitchen.

Refrigerators are gradually becoming larger and more multi-functional in accordance with changes in eating habits and the trend of high quality products, and refrigerators equipped with various structures and convenient devices considering user convenience are being released.

In Korean Patent Publication No. 10-2010-0054353, which is a prior document, a refrigerator is disclosed.

The refrigerator includes a main body having a storage space, a door that selectively shields the storage space of the main body, and a wire harness connecting various electric and electronic components including a plurality of sensors and switches provided in the main body and the door, and a harness guide accommodating the wire harness.

The harness guide includes a first guide connected to have a rotational shaft fixed to one side of the main body, and a second guide having a rotational shaft at one side of the door and connected to the first guide.

However, in the case of the prior document, the first guide and the second guide are each formed in a curved shape, and the wire harness exists in a bent state within each guide in a state where the door is closed. When the door is opened, the wire harness is deformed into an unfolded state by the rotation of each guide.

In the case of this prior document, the amount of deformation of the wire harness is large when the door is opened and closed, and thus there is a risk of damage to the wire harness.

In the case of the prior document, since the wire harness is exposed to the outside in a state where each guide accommodates the wire harness, there is a risk of damage to the wire harness due to external obstacles.

In addition, a water hose for supplying water to a dispenser, an ice maker, or the like may be also accommodated in the wire harness.

However, as in the prior document, when the amount of bending of the water hose is large in a state where the door is closed, the water hose tends to be stretched by the tension of the water hose. When the door is opened in this state, the water hose is excessively bent in the opposite direction when being stretched, and as a result, there is a risk of damage to the water hose, and in this case, there is a risk of water leakage.

DISCLOSURE

Technical Problem

The present embodiment provides a refrigerator in which the guide housing and the refrigerator door are easily connected.

Optionally or additionally, the present embodiment provides a refrigerator in which the guide housing is rotated with respect to the refrigerator door while the door is opened, thereby minimizing the amount of bending of the wire and/or water pipe.

Optionally or additionally, the present embodiment provides a refrigerator in which movement of a guide housing connected to a refrigerator door in a horizontal direction is restricted while the door is opened.

Technical Solution

A refrigerator according to an aspect may include a cabinet having a storage space; a refrigerator door rotatably connected to the cabinet by a hinge apparatus and opening and closing the storage space; an extension member drawn out from the cabinet, connected to an inside of the refrigerator door through a door opening spaced apart from a rotational center of the refrigerator door in the refrigerator door, and including at least one of a wire and a pipe through which liquid flows; a guide housing configured to guide the extension member located outside the cabinet and the refrigerator door and including a plurality of separate housings which are rotatably connected to each other; and a door fixing portion rotatably connecting a first housing among the plurality of separate housings to the refrigerator door.

The door fixing portion may include a fixing body including a hole through which the first housing passes.

The refrigerator door may be provided with a seating groove in which the fixed body is seated. The door opening may be provided in the seating groove.

A flange may be provided around the first housing. The maximum width or diameter of the first housing may be smaller than the diameter of the hole. The diameter of the flange may be greater than the diameter of the hole.

A remaining portion of the first housing other than the flange may pass through the hole.

The first housing may include a horizontal extension portion and an upper and lower extension portion bent from the horizontal extension portion. The flange may be provided around an end portion of the upper and lower extension portion.

The flange may be seated in the seating groove. A flange guide for guiding rotation of the flange may be provided in the seating groove.

A plurality of flange guides may be disposed spaced apart from each other in the seating groove. Each flange guide may include a rounded surface. The rounded surface may be formed in an arc shape centered on a center of the door opening.

The plurality of flange guides may be symmetrically disposed with respect to the center of the door opening.

The door opening may be disposed between a pair of flange guides. The surfaces facing each other in the pair of flange guides may include the rounded surfaces.

The door fixing portion may include a coupling hook protruding from the fixing body and coupled to the refrigerator door. The flange guide may be spaced apart from a side wall forming the seating groove. A hook slot through which the coupling hook passes may be disposed between the side wall and the flange guide in the seating groove.

The door fixing portion may further include an extension wall extending downward from an edge of the fixing body and positioned between the side wall and the flange guide in a state in which the coupling hook passes through the hook slot.

The refrigerator door may include a recessed portion provided at a position spaced downward from an upper surface of the refrigerator door. The seating groove may be formed by being recessed downward from the bottom of the recessed portion.

The hinge apparatus may be connected to the bottom of the recessed portion.

An accommodation groove in which the flange is seated may be provided in the seating groove.

The door opening may be formed in the accommodation groove.

The fixing body may be provided with one or more fastening holes. One or more fastening portions aligned with the one or more fastening holes may be provided in the seating groove.

The seating groove may be formed by being recessed in an upper surface of a door of the refrigerator.

The refrigerator may further include a door cover fastened to an upper surface of the refrigerator door and covering the first housing connected to the refrigerator door.

The door cover may include a passage through which the first housing is located. A distance between the center of the opening of the door and the front surface of the refrigerator door may be greater than a distance between the rotational center of the refrigerator door and the front surface of the refrigerator door.

Advantageous Effect

According to the present embodiment, there is an advantage in that it is easy to connect the guide housing and the refrigerator door in a closed state.

According to the present embodiment, since the guide housing is rotated with respect to the refrigerator door while the door is opened, the amount of bending of the wire and/or the water pipe can be minimized.

According to the present embodiment, movement of the guide housing connected to the refrigerator door in the horizontal direction while the door is opened may be restricted.

BEST MODE

Figure 1:
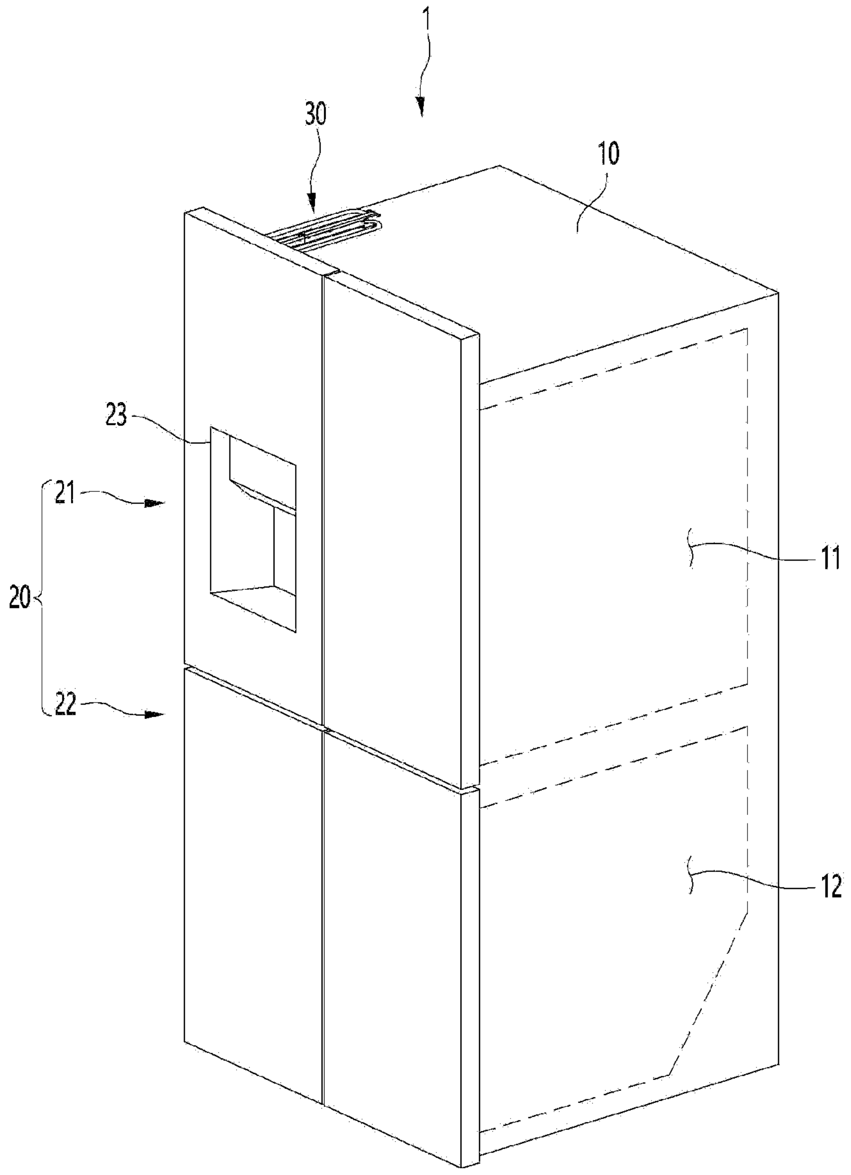
FIG. 1 is a perspective view illustrating a refrigerator according to the present embodiment.

Hereinafter, some embodiments of the present disclosure will be described in detail through exemplary drawings. In adding reference numerals to components of each drawing, it should be noted that the same components have the same numerals as much as possible even if they are displayed on different drawings. In addition, in describing an embodiment of the present disclosure, if it is determined that a detailed description of a related known configuration or function hinders understanding of the embodiment of the present disclosure, the detailed description is omitted.

Also, terms such as first, second, A, B, (a), (b) or the like may be used herein when describing components of the embodiment of the present disclosure. Each of these terminologies is not used to define an essence, order or sequence of a corresponding component but used merely to distinguish the corresponding component from other component(s). It should be noted that when a component is described as being "connected," "coupled," or "joined" to another component, that component may be directly connected or joined to the other component, but another component may be "connected", "coupled" or "joined" between each component.

Figure 2:
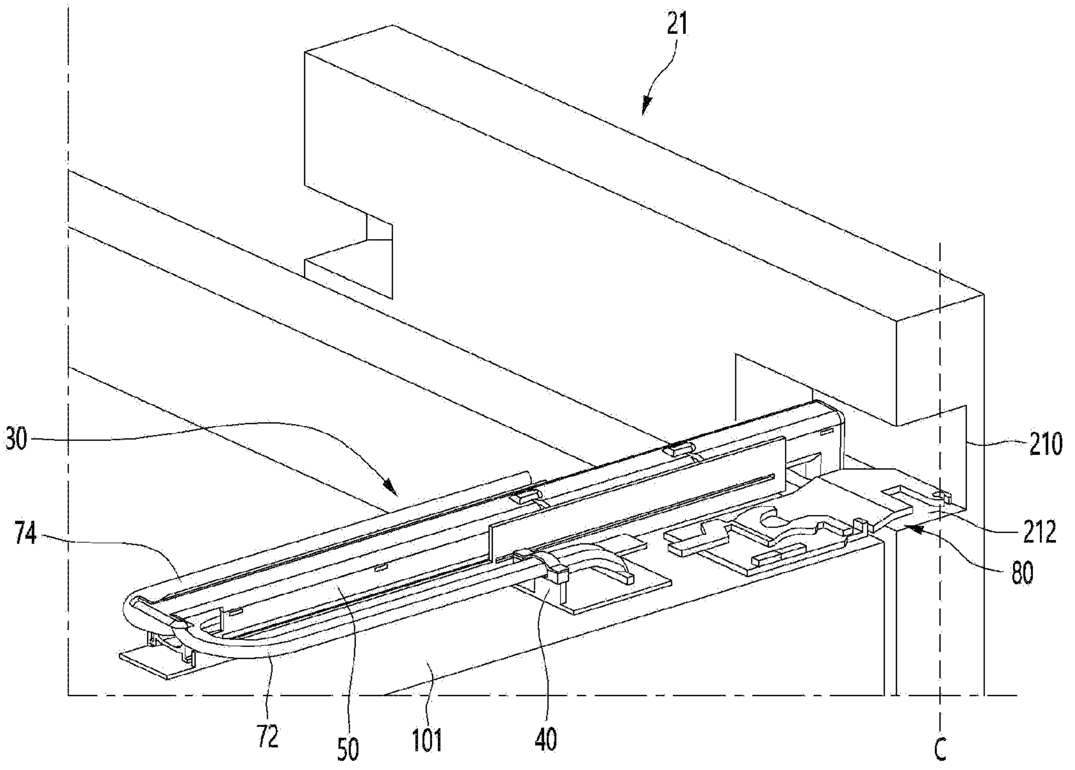
FIG. 2 is a perspective view illustrating a state where a guide unit is connected to a cabinet and a door.
Figure 3:
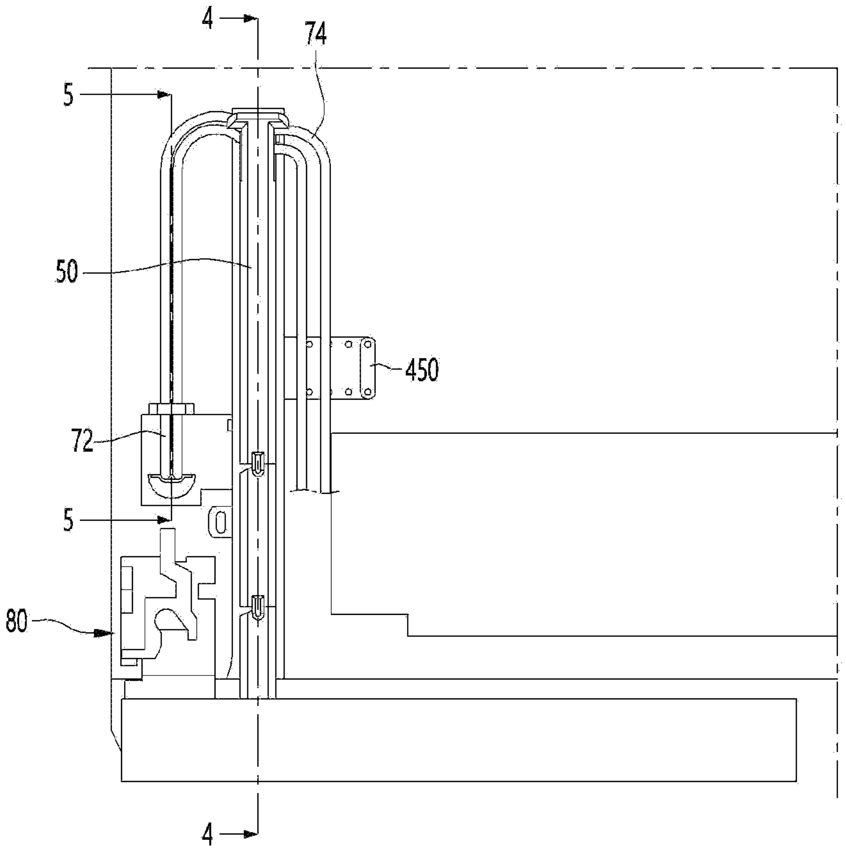
FIG. 3 is a plan view illustrating a state where a guide unit is connected to a cabinet and a door.
Figure 4:
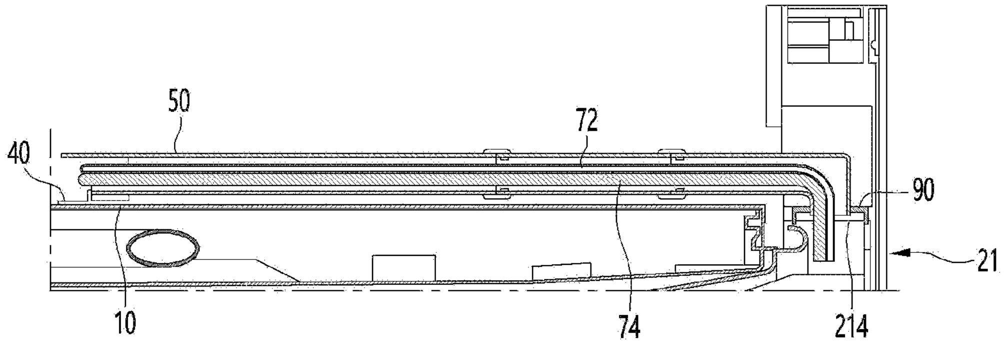
FIG. 4 is a cross-sectional view taken along line 4-4 of FIG. 3.

FIG. 1 is a perspective view illustrating a refrigerator according to the present embodiment, FIG. 2 is a perspective view illustrating a state where a guide unit is connected to a cabinet and a door, FIG. 3 is a plan view illustrating a state where a guide unit is connected to a cabinet and a door, FIG.

Figure 5:
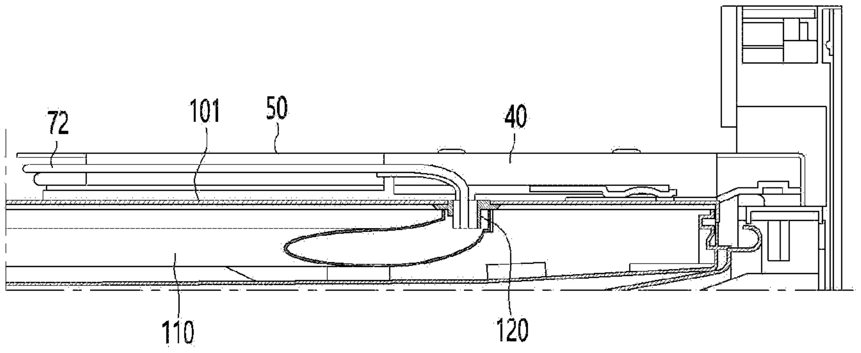
FIG. 5 is a cross-sectional view taken along line 5-5 of FIG. 3.

4 is a cross-sectional view taken along line 4-4 of FIG. 3, and FIG. 5 is a cross-sectional view taken along line 5-5 of FIG. 3.

Referring to FIGS. 1 to 5, the refrigerator 1 according to the present embodiment may be installed independently in a kitchen or installed in a form accommodated in an indoor furniture cabinet.

When the refrigerator 1 is installed in an indoor furniture cabinet, the refrigerator 1 may be installed alone or arranged with other refrigerators in the left and right direction.

The refrigerator 1 may include a cabinet 10 having a storage space and a refrigerator door 20 opening and closing the storage space.

The storage space is not limited, but may be divided into an upper first space 11 and a lower second space 12, and the refrigerator door 20 also may include a first door 21 which opens and closes the first space 11 and a second door 22 which opens and closes the second space 12.

The first space 11 may be a refrigerating chamber, and the second space 12 may be a freezing chamber or vice versa. Alternatively, the storage space may include a first space and a second space divided into left and right sides. Alternatively, the storage space may be a single space, and a single refrigerator door may open and close the storage space.

At least one of the first door 21 and the second door 22 may be a rotation type door. Alternatively, the single refrigerator door 20 may be a rotation type door.

In the present embodiment, for example, the state where the two first doors 21 are disposed in the left and right direction will be described.

The first door 21 may be rotatably connected to the cabinet 10 by a hinge apparatus 80. The hinge apparatus 80 may include a hinge pin providing a rotational center C of the first door 21.

Any one of the two first doors 21 may include a dispenser 23. The dispenser 23 may discharge water and/or ice. FIG. 1 illustrates that the dispenser 23 is provided in the first door 21 on the left side as an example.

Although not illustrated, a component that operates to discharge water and/or ice may be provided in the first door 21. The component may be electrically connected to the wire 74. Alternatively, apart from the components, the first door 21 may include a display and/or an input portion, and the display and/or input unit may be electrically connected to the wire 74.

For example, the wire 74 may be connected to a controller provided in the cabinet 10. The wire 74 may be introduced into the first door 21 and directly or indirectly connected to the component (when connected to a separate wire provided inside the first door).

In order for the dispenser 23 to discharge water, the dispenser 23 may be connected to the water pipe 72. The water pipe 72 may be introduced into the first door 21 through the first door 21 after being drawn out from the inside of the cabinet 10.

In this specification, it should be noted that the fact that the wire 74 and/or the water pipe 72 is introduced into the first door 21 or the cabinet 10 is also interpreted that, on the contrary, the wire 74 and/or the water pipe 72 is drawn out from the first door 21 or the cabinet 10.

The water pipe 72 may be introduced into the first door 21 and directly or indirectly connected to the dispenser 23 (when connected to a separate additional water pipe provided inside the first door).

In the present embodiment, one or more of the water pipe 72 and the wire 74 may be introduced into the first door 21. FIG. 2 illustrates, for example, that the water pipe 72 and the wire 74 are introduced into the first door 21.

When the refrigerator 1 is installed in a furniture cabinet in a kitchen, the refrigerator door 20 may generally protrude toward the front of the cabinet, although it may vary depending on the size of the cabinet. In order to prevent the refrigerator door 20 from protruding forward of the furniture cabinet, it may be considered to reduce the thickness of the refrigerator door 20.

In the case of a general refrigerator 1, since the thickness of the refrigerator door 20 is thick, the diameter of the hinge pin of the hinge apparatus 80 can be increased, and in this case, the water pipe 72 and the wire 74 can pass through hinge pins.

However, when the thickness of the refrigerator door 20 is reduced, the diameter of the hinge pin must be reduced. When the diameter of the hinge pin is reduced, the water pipe 72 and the wire 74 cannot pass through the hinge pin. In this case, the water pipe 72 and the wire 74 may pass through the refrigerator door 20 at a position spaced apart from the hinge apparatus and be introduced into the refrigerator door 20.

In the case of the present embodiment, the water pipe 72 and the wire 74 may pass through the first door 21 at one side of the hinge apparatus 80 in the first door 21.

The present embodiment may further include a guide unit 30 for guiding the water pipe 72 and the wire 74.

The guide unit 30 protects the water pipe 72 and the wire 74 and can be minimized exposure of the water pipe 72 and the wire 74 to the outside while the first door 21 is opened.

The guide unit 30 may include a guide housing 50 accommodating the water pipe 72 and the wire 74.

The guide unit 30 may further include a cabinet guide 40 fixed to the cabinet 10 and guiding movement of the guide housing 50.

The cabinet guide 40 may be coupled to a position adjacent to the hinge apparatus 80 in the cabinet 10.

The water pipe 72 may be drawn out from the cabinet 10 directly behind the hinge apparatus 80 and accommodated in the guide housing 50.

The water pipe 72 drawn out from the cabinet 10 may be introduced into the guide housing 50 from the rear side of the guide housing 50 after being extended rearward.

A protective guide 120 may be provided on the upper wall 101 of the cabinet 10 to protect the water pipe 72 while the water pipe 72 passes therethrough.

A guide pipe 110 connected to the protective guide 120 and guiding the water pipe 72 may be provided inside the cabinet 10.

The wire 74 is located on the opposite side of the water pipe 72 based on the guide housing 50 and may be introduced into the guide housing 50 from the rear side of the guide housing 50.

Accordingly, the water pipe 72 and the hinge apparatus 80 may be positioned on one side of the guide housing 50, and the wire 74 may be positioned on the other side thereof.

When the first door 21 is closed, the guide housing 50 may extend in a straight line form. Referring to FIG. 3, the guide housing 50 may extend in a straight line in the front and rear direction.

Accordingly, the water pipe 72 and the wire 74 may also be guided toward the first door 21 in a straight line form within the guide housing 50.

The upper surface of the first door 21 may be located higher than the upper surface of the cabinet 10. In order for the guide housing 50, which is movable along the cabinet guide 40 installed on the upper surface of the cabinet 10, to be connected to the first door 21, the first door 21 may include a recessed portion 210.

The recessed portion 210 may be formed as the rear surface of the first door 21 is recessed forward or as the side surface of the first door 21 is recessed. The recessed portion 210 may be disposed at a position spaced downward from the upper surface of the first door 21.

Substantially, the bottom 212 of the recessed portion 210 may be located at the same height as or substantially similar to the top surface of the cabinet 10.

A portion of the hinge apparatus 80 may be introduced into the recessed portion 210 and connected to the bottom 212.

[When the first door 21 is closed, a portion of the guide housing 50 extending in a straight line form is introduced into the recessed portion 210 and can be connected to the bottom 212 by the door fixing portion 90.

In the case of the present embodiment, the water pipe 72 and the wire 74 are guided to the recessed portion 210 of the first door 21 in a straight line form within the guide housing 50, so that bending of the water pipe 72 and the wire 74 in the guide housing 50 can be minimized.

A door opening 214 may be formed at the bottom 212 of the recessed portion 210. The water pipe 72 and the wire 74 guided to the recessed portion 210 may pass through the door opening 214 and be introduced into the first door 21. Alternatively, the water pipe 72 and the wire 74 drawn out from the inside of the first door 21 through the door opening 214 may be guided toward the cabinet 10 by the guide housing 50.

Hereinafter, the guide housing will be described in detail.

Figure 6:
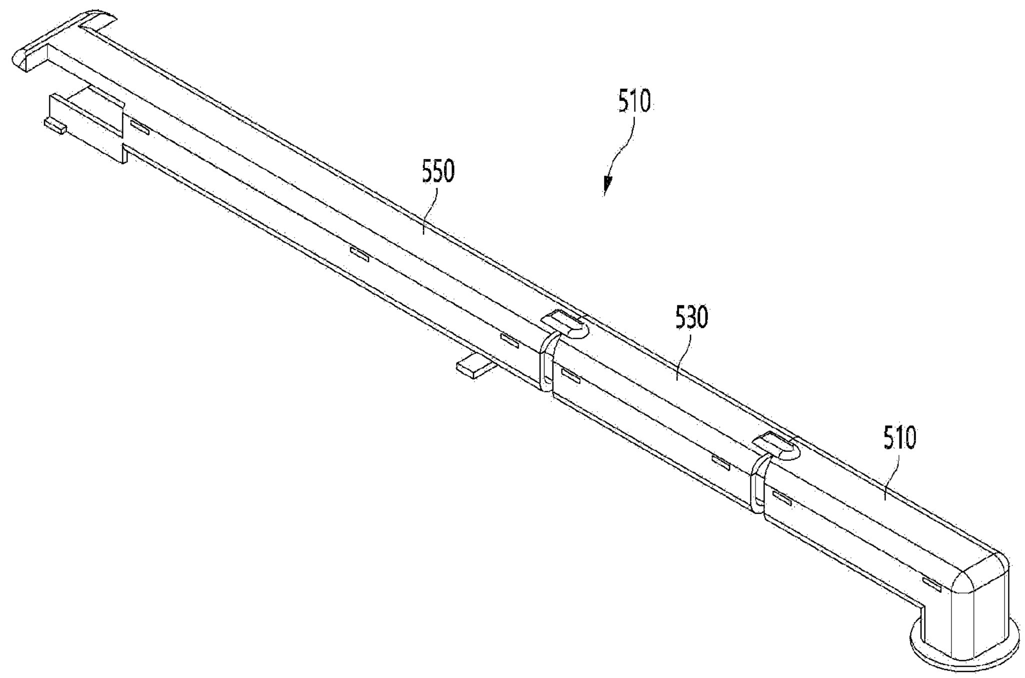
FIG. 6 is a perspective view illustrating the guide housing of the present embodiment.
Figure 7:
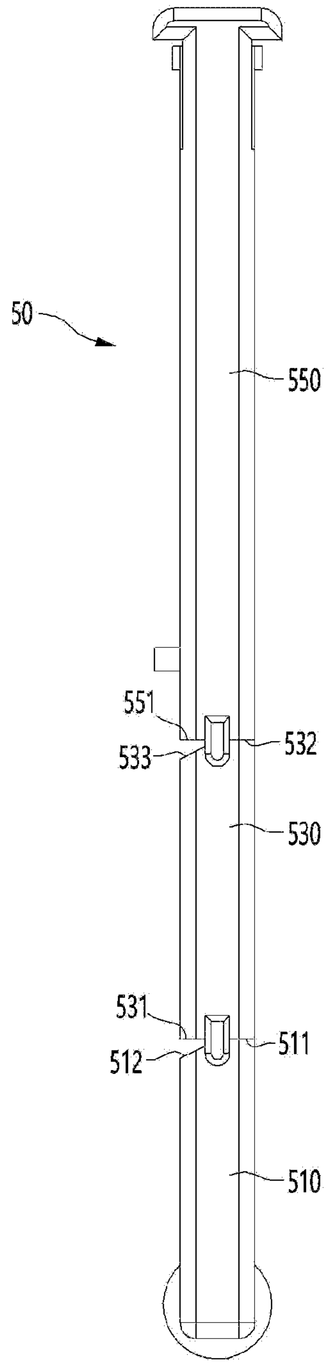
FIG. 7 is a plan view illustrating the guide housing of the present embodiment.
Figure 8:
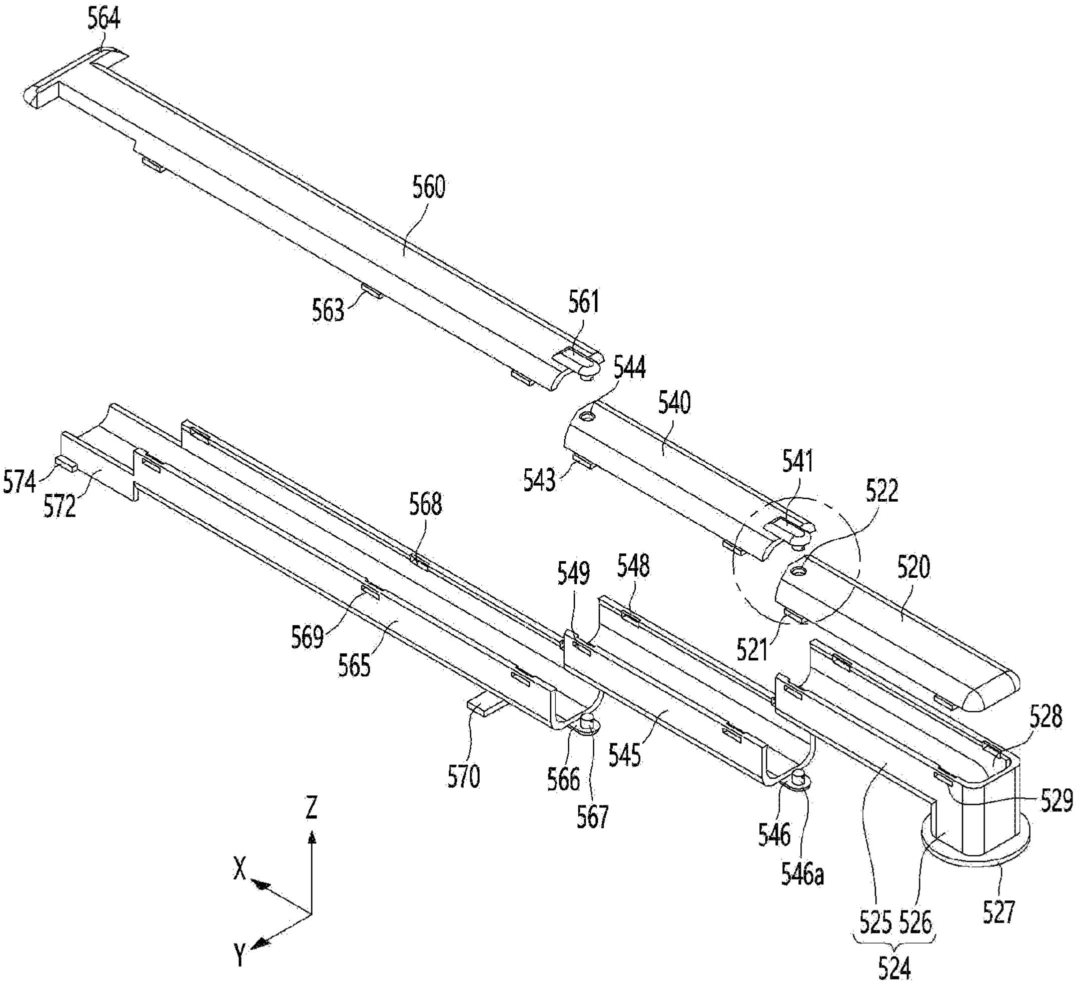
FIG. 8 is an exploded perspective view illustrating the guide housing of the present embodiment.
Figure 9:
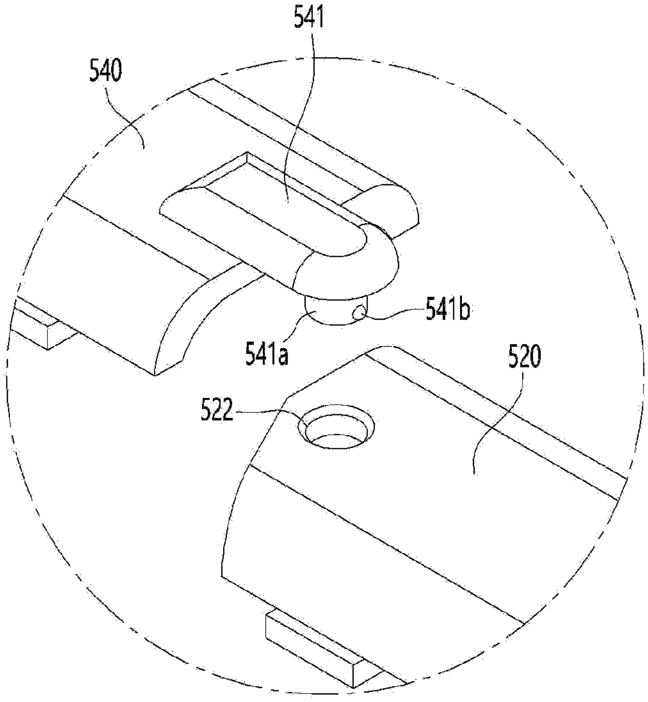
FIG. 9 is a view illustrating a coupling structure of a first housing and a second housing.
Figure 10:
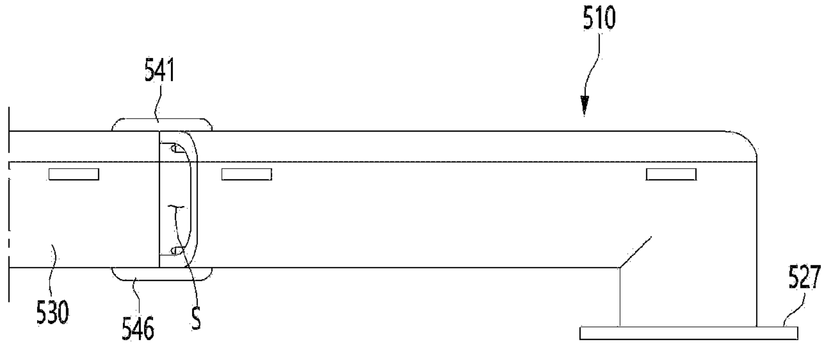
FIG. 10 is a side view illustrating a state where the first housing and the second housing are coupled.

FIG. 6 is a perspective view illustrating the guide housing of the present embodiment, FIG. 7 is a plan view illustrating the guide housing of the present embodiment, FIG. 8 is an exploded perspective view illustrating the guide housing of the present embodiment, FIG. 9 is a view illustrating a coupling structure of a first housing and a second housing, and FIG. 10 is a side view illustrating a state where the first housing and the second housing are coupled.

Referring to FIGS. 6 to 10, the guide housing 50 may be formed by combining a plurality of separate housings.

The guide housing 50 may include, for example, a first housing 510 and a second housing 530.

The first housing 510 may be rotatably connected to the first door 21. In the present embodiment, the first housing 510 may be referred to as a door connection housing.

The second housing 530 may be rotatably connected to the first housing 510.

The guide housing 50 may further include a third housing 550.

The third housing 550 may be rotatably connected to the second housing 530, and may be movably connected to the cabinet guide 40. In the present embodiment, the third housing 550 may be referred to as a guide connection housing or a cabinet connection housing.

In the present embodiment, the second housing 530 may be referred to as an intermediate housing positioned between the first housing 510 and the third housing 550.

In the present embodiment, it is disclosed that one intermediate housing is provided between the first housing 510 and the third housing 550, but a plurality of intermediate housings may be provided otherwise.

However, when the number of intermediate housings increases, the overall structure of the guide housing becomes complicated and the assembly process thereof becomes complicated, so it may be preferable that one or two intermediate housings are provided between the first housing 510 and the third housing 550.

A portion of the first housing 510 may be extended in a straight line form in a horizontal direction and another portion of the first housing 510 may be bent and extended in a vertical direction. A portion extending in the vertical direction may be connected to the first door 21.

Accordingly, the water pipe 72 and the wire 74 extending in the horizontal direction by the first housing 510 are bent to pass through the first door 21 in the vertical direction.

The first housing 510 may include a first upper housing 520 and a first lower housing 524 coupled to the first upper housing 520.

By combining the first upper housing 520 and the first lower housing 524, a passage through which the water pipe 72 and the wire 74 can be positioned may be formed. In another aspect, the first lower housing 524 may form the passage and the first upper housing 520 may cover the passage.

When the water pipe 72 and the wire 74 are accommodated in the first housing 510, exposure of the water pipe 72 and the wire 74 to the outside can be minimized.

For example, the first lower housing 524 may include a horizontal extension portion 525 and an upper and lower extension portion 526 bent at an end portion of the horizontal extension portion. The first upper housing 520 may be coupled to the horizontal extension portion 525.

Accordingly, the water pipe 72 and the wire 74 extending in the horizontal direction by the horizontal extension portion 525 may be bent by the upper and lower extension portion 526 and extend in the vertical direction.

A flange 527 may be provided around the upper and lower extension portions 526. For example, a flange 527 may be provided at a lower end of the upper and lower extension portion 526.

A line extending along the outer circumference of the flange 527 may be, for example, circular. The flange 527 may be seated on the first door 21 and relatively rotated with respect to the first door 21.

The first upper housing 520 may include a hook 521 for coupling with the first lower housing 524. For example, hooks 521 may be provided on both sides of the first upper housing 520, respectively. A plurality of hooks 521 may be provided in the longitudinal direction (X-axis direction) of the first upper housing 520 to increase the coupling force between the first upper housing 520 and the first lower housing 524. In the present embodiment, the "longitudinal direction" may be the front and rear direction of the refrigerator or the extension direction of the water pipe 72 and the wire 74 in the horizontal extension portion 525.

The first lower housing 524 may include a hook slot 529 to which the hook 521 is coupled. The number of hook slots 529 is the same as the number of hooks 521.

The first upper housing 520 and the first lower housing 524 may be coupled in a direction crossing the longitudinal direction (for example, a Z-axis direction).

For example, the first upper housing 520 may be coupled to the first lower housing 524 while moving downward. The first lower housing 524 may include a guide groove 528 for guiding the hook 521 when the first upper housing 520 is coupled with the first lower housing 520. The guide groove 528 may be formed as a portion of the upper surface of the first upper housing 520 is recessed downward. Alternatively, the guide groove 528 may be formed as a portion of the inner surface of the first upper housing 520 is recessed outward.

The hook slot 529 may be located at a position corresponding to the lower end portion of the guide groove 528. Accordingly, when the hook 521 is aligned with the hook slot 529 while moving downward along the guide groove 528, the hook 521 can be inserted into and coupled to the hook slot 529.

Contrary to what has been described above, it is also possible that the first lower housing 524 includes a hook and the first upper housing 520 includes a hook slot and a hook groove.

The first housing 510 may be rotatably connected to the second housing 530. To this end, the first housing 510 may include a hinge hole 522.

The hinge hole 522 may be formed in each of the first upper housing 520 and the first lower housing 524. A pair of hinge holes 522 formed in each of the first upper housing 520 and the first lower housing 524 may be aligned in a vertical direction.

The hinge hole 522 may be disposed at a position spaced apart from each other by a predetermined distance from the first end portion to the second end portion of each of the first upper housing 520 and the first lower housing 524.

In the present embodiment, the first end portion is an end portion adjacent to the second housing 530, and the second end portion is an end portion opposite to the first end portion.

The second housing 530 may be rotatably connected to the first housing 510. For example, the second housing 530 may be relatively rotatably connected to the first housing 510 based on a first joint (or a first rotational center).

The first housing 510 may rotate only in the first direction with respect to the second housing 530 while the first door 21 is opened in a state in which the first door 21 is closed. In the present embodiment, the first direction means a clockwise direction based on FIG. 7.

For example, in a state in which the first door 21 is closed, the first housing 510 may include a first contact surface 511 contacting the front surface 531 of the second housing 530, and a first inclined surface 512 extending from the first contact surface 511. When the first door 21 is closed, the first inclined surface 512 is spaced apart from the front surface 531 of the second housing 530.

While the first door 21 is opened, the first contact surface 511 is spaced apart from the front surface 531 of the second housing 530, and when the first door 21 is maximally opened, the first inclined surface 512 may contact the front surface 531 of the second housing 530. Of course, even when the first door 21 is maximally opened, the first inclined surface 512 may be spaced apart from the front surface 531 of the second housing 530.

When the first door 21 is closed, a space S may be formed between the first inclined surface 512 and the front surface 531 of the second housing 530.

The space S allows the first housing 510 to rotate in the first direction with respect to the second housing 530 while the first door 21 is opened.

The basic structure of the second housing 530 may be the same as or similar to that of the first housing 510.

For example, the second housing 530 may include a second upper housing 540 and a second lower housing 545 coupled to the second upper housing 540.

By combining the second upper housing 540 and the second lower housing 545, a passage through which the water pipe 72 and the wire 74 can be positioned may be formed. In another aspect, the second lower housing 545 may form the passage and the second upper housing 540 may cover the passage.

When the water pipe 72 and the wire 74 are accommodated in the second housing 530, exposure of the water pipe 72 and the wire 74 to the outside can be minimized.

A coupling structure between the second upper housing 540 and the second lower housing 545 may be the same as or similar to a coupling structure between the first upper housing 520 and the first lower housing 524.

For example, the second upper housing 540 may include a hook 543, and the second lower housing 545 may include a guide groove 548 and a hook slot 549.

The second upper housing 540 and the second lower housing 545 may include hinge portions to be coupled to the hinge holes 522 of the first upper housing 520 and the first lower housing 524.

The hinge portion may include hinge bodies 541 and 546 extending from the second upper housing 540 and the second lower housing 545 toward the first housing 510, and hinge pins 541*a* and 546*a* protruding from the hinge bodies 541 and 546 and passing through the hinge hole 522.

The hinge bodies 541 and 546 may extend from the second upper housing 540 and the second lower housing 545 toward the first housing 510 in the longitudinal direction (X-axis direction). The hinge pins 541*a* and 546*a* may protrude from the hinge bodies 541 and 546 in a direction (Z-axis direction) crossing the extension direction of the hinge bodies 541 and 546.

Protruding lengths of the hinge pins 541*a* and 546*a* may be greater than thicknesses (in the Z-axis direction) of the first upper housing 520 and the first lower housing 524.

The hinge body 541 of the second upper housing 540 may be positioned above the first upper housing 520. The hinge pin 541*a* of the second upper housing 540 may protrude downward from the lower surface of the hinge body 541. Accordingly, the hinge pin 541*a* of the second upper housing 540 may pass through the hinge hole 522 of the first upper housing 520.

The hinge body 546 of the second lower housing 545 may be positioned below the first lower housing 524. The hinge pin 546*a* of the second lower housing 545 may protrude upward from the upper surface of the hinge body 546. Accordingly, the hinge pin 546*a* of the second lower housing 545 may pass through the hinge hole 522 of the first lower housing 524.

The outer diameters of the hinge pins 541*a* and 546*a* may be equal to or smaller than the diameter of the hinge hole 522. One or more protrusions 541*b* in a horizontal direction from the hinge pins 541*a* and 546*a* may protrude so that separation from the hinge hole 522 is minimized while the hinge pins 541*a* and 546*a* pass through the hinge hole 522. When the plurality of protrusions 541*b* are provided on the hinge pins 541*a* and 546*a*, the plurality of protrusions 541*b* may be disposed symmetrically with respect to the hinge pins 541*a* and 546*a*.

The protrusion 541*b* may be inserted into the first housing 510 through the hinge hole 522 together with the hinge pins 541*a* and 546*a*. After the protrusion 541*b* passes through the hinge hole 522 together with the hinge pins 541*a* and 546*a*, the protrusion 541*b* is caught on the inner wall of the first housing 510 to prevent the hinge pin 541*a*, 546*a* from being easily separated.

Contrary to what has been described above, it is also possible that the second housing 530 includes a hinge hole and the first housing 510 includes a hinge portion coupled to the hinge hole.

The third housing 550 may be rotatably connected to the second housing 530. For example, the third housing 550 may be relatively rotatably connected to the second housing 530 based on a second joint (or a second rotational center).

The second housing 530 can rotate only in the first direction with respect to the third housing 550 while the first door 21 is opened in a state in which the first door 21 is closed.

For example, when the first door 21 is closed, the second housing 530 may include a second contact surface 532 contacting the front surface 551 of the third housing 550, and a second inclined surface 533 extending from the second contact surface 532. When the first door 21 is closed, the second inclined surface 533 is spaced apart from the front surface 551 of the third housing 550.

While the first door 21 is opened, the second contact surface 532 is spaced apart from the front surface 551 of the third housing 550, and when the first door 21 is maximally opened, the second inclined surface 533 may contact the front surface 551 of the third housing 550. Of course, even when the first door 21 is maximally opened, the second inclined surface 533 may be spaced apart from the front surface 551 of the third housing 550.

When the first door 21 is closed, a space S may be formed between the second inclined surface 533 and the front surface 551 of the third housing 550.

The space S allows the second housing 530 to rotate in the first direction with respect to the third housing 550 while the first door 21 is opened.

A basic structure of the third housing 550 may be the same as or similar to that of the second housing 530. However, the length of the third housing 550 may be longer than the lengths of the first housing 510 and the second housing 530.

When the length of the third housing 550 is longer than the lengths of the first housing 510 and the second housing 530, the lengths of the water pipe 72 and the wire 74 located outside the cabinet 10 are greater than the moving distances of the water pipe 72 and the wire 74 moving together with the first door 21 while the first door 21 is opened. Accordingly, movement of the water pipe 72 and the wire 74 on the protective guide 120 while the first door 21 is opened can be prevented.

For example, the third housing 550 may include a third upper housing 560 and a third lower housing 565 coupled to the third upper housing 560.

By combining the third upper housing 560 and the third lower housing 565, a passage through which the water pipe 72 and the wire 74 can be positioned may be formed. In another aspect, the third lower housing 565 may form the passage and the third upper housing 560 may cover the passage.

When the water pipe 72 and the wire 74 are accommodated in the third housing 550, exposure of the water pipe 72 and the wire 74 to the outside can be minimized.

A coupling structure between the third upper housing 560 and the third lower housing 565 may be the same as or similar to a coupling structure between the second upper housing 540 and the second lower housing 545.

For example, the third upper housing 560 may include a hook 563, and the third lower housing 565 may include a guide groove 568 and a hook slot 569.

The third upper housing 560 and the third lower housing 565 may include hinge portions to be coupled to the hinge holes 544 of the first upper housing 540 and the first lower housing 545.

The hinge portion may include hinge bodies 561 and 566 extending from the third upper housing 560 and the third lower housing 565 toward the second housing 530, and a hinge pin 567 protruding from the hinge bodies 561 and 566 and passing through the hinge hole 544.

The hinge bodies 561 and 566 may extend in the longitudinal direction (X-axis direction) from the third upper housing 560 and the third lower housing 565. The hinge pin 567 may protrude from the hinge bodies 561 and 566 in a direction (Z-axis direction) crossing the extension direction of the hinge bodies 561 and 566.

The protruding length of the hinge pin 557 may be greater than the thicknesses (Z-axis direction) of the second upper housing 540 and the second lower housing 545.

The hinge body 561 of the third upper housing 560 may be positioned above the second upper housing 540. The hinge pin 567 of the third upper housing 560 may protrude downward from the lower surface of the hinge body 561. Accordingly, the hinge pin 567 of the third upper housing 560 may pass through the hinge hole 544 of the second upper housing 540.

The hinge body 566 of the third lower housing 565 may be positioned below the second lower housing 545. The hinge pin 567 of the third lower housing 565 may protrude upward from the upper surface of the hinge body 566. Accordingly, the hinge pin 567 of the third lower housing 565 may pass through the hinge hole 544 of the second lower housing 545. The aforementioned protrusion may also be provided on the hinge pin 567.

Contrary to what has been described above, it is also possible that the third housing 550 includes a hinge hole and the third housing 530 includes a hinge portion coupled to the hinge hole.

The guide housing 50 may further include a guide rib 570. The cabinet guide 40 may include a guide slot for accommodating the guide rib 570 and guiding the movement of the guide rib 570.

For example, the guide rib 570 may be provided in the third housing 530. The guide rib 570 may protrude in a horizontal direction from at least one side of the third housing 550. For example, the guide rib 570 may extend in the Y-axis direction crossing the longitudinal direction in the horizontal direction in the third housing 550. The guide slot may guide the movement of the guide rib 570 in the longitudinal direction.

A lower extension portion 572 extending downward at a position spaced apart from the guide rib 570 in the third housing 550 and a limiting rib 574 protruding from the lower extension portion 572 are further included.

The limiting rib 574 may restrict movement of the third housing 550 in the vertical direction (Z-axis direction) during the movement of the third housing 530 in the longitudinal direction.

Figure 11:
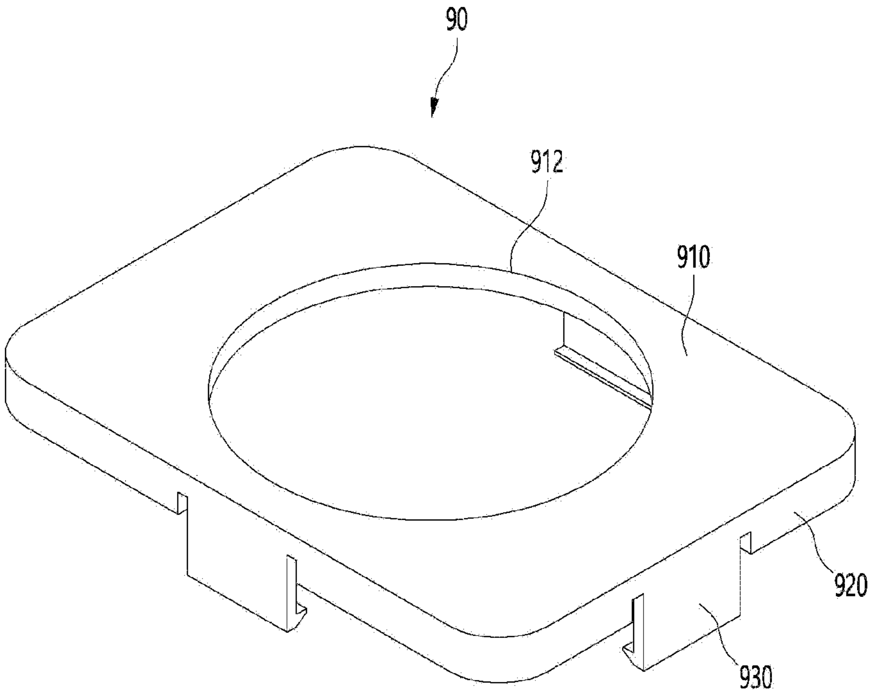
FIGS. 11 and 12 are perspective views illustrating the door fixing portion according to the present embodiment.
Figure 12:
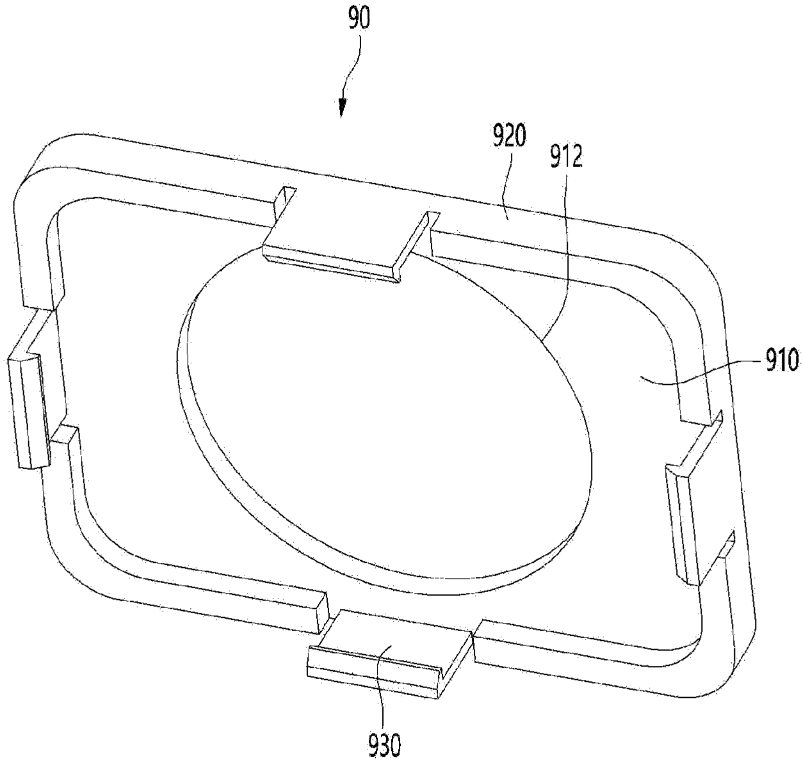
Figure 13:
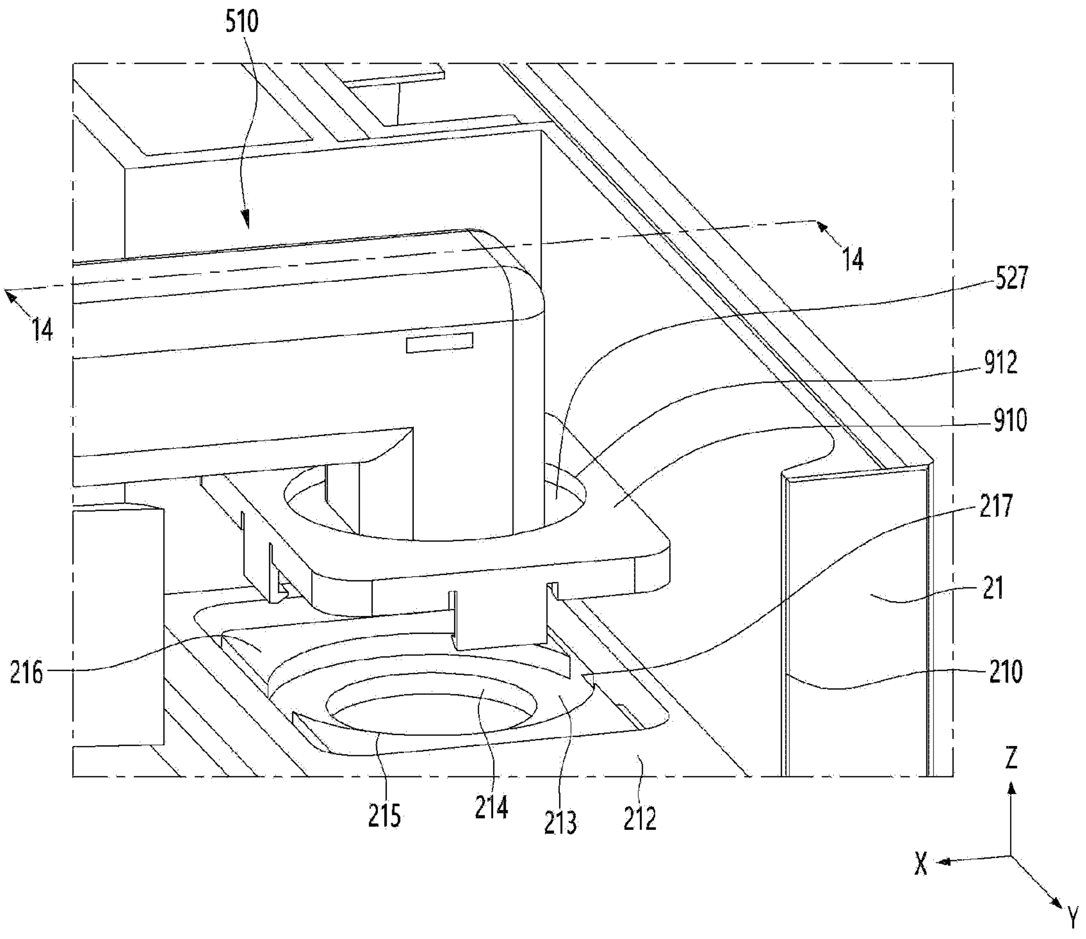
FIG. 13 is a view illustrating a state before the first housing is coupled to the first door by the door fixing portion.
Figure 14:
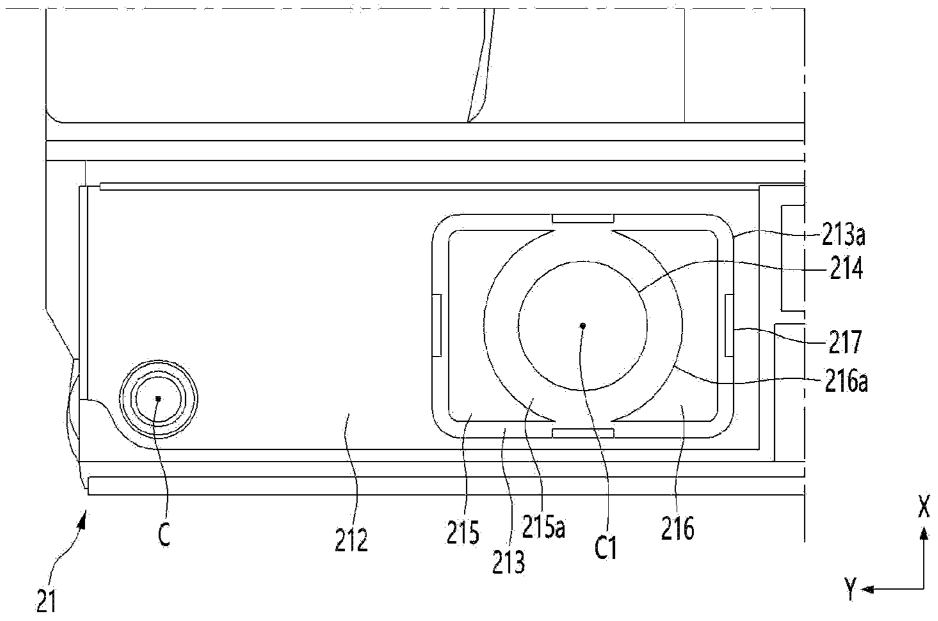
FIG. 14 is a view illustrating a door opening provided in a first door.
Figure 15:
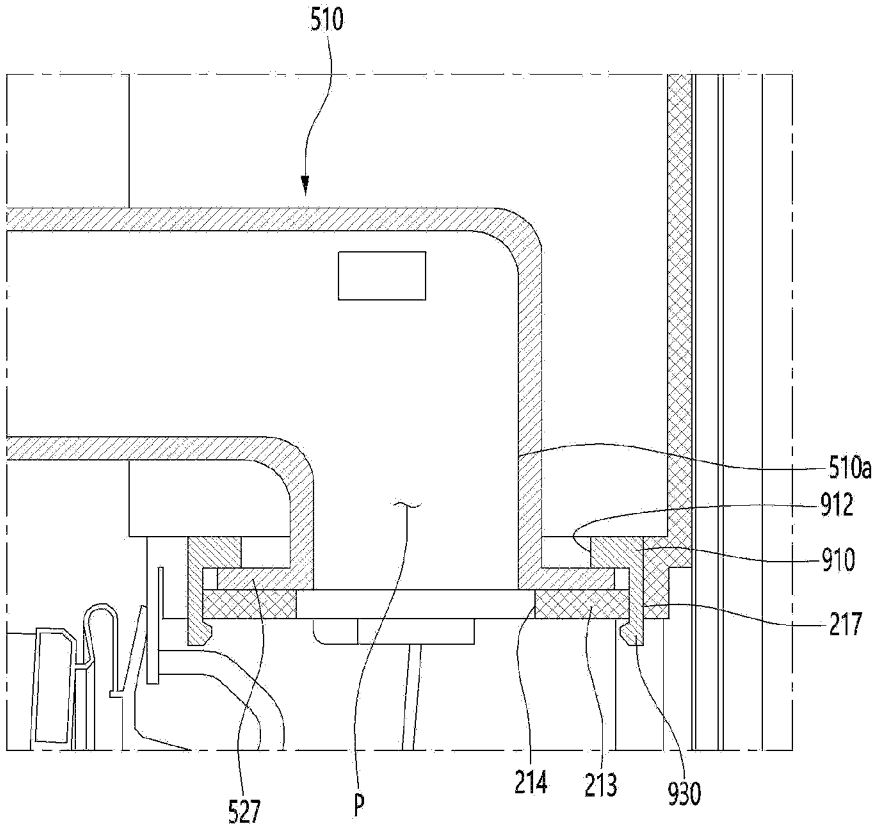
FIG. 15 is a cross-sectional view taken along line 15-15 of FIG. 13.

FIGS. 11 and 12 are perspective views illustrating the door fixing portion according to the present embodiment, FIG. 13 is a view illustrating a state before the first housing is coupled to the first door by the door fixing portion, FIG. 14 is a view illustrating a door opening provided in a first door, and FIG. 15 is a cross-sectional view taken along line 15-15 of FIG. 13.

Referring to FIGS. 11 to 15, the door fixing portion 90 may include a fixing body 910. A hole 912 through which the first housing 510 passes may be provided in the fixed body 910.

A diameter of the hole 912 may be smaller than a diameter of the flange 527 of the first housing 510. The diameter of the hole 912 may be greater than the maximum width or diameter of the first housing 510 excluding the flange 527.

The first housing 510 may pass through the hole 912 at the lower side of the fixed body 910, and in this state, when the door fixing portion 90 is coupled to the first door 21, the flange 527 may contact the lower surface of the fixed body 910.

The door fixing portion 90 may further include a coupling hook 930 extending downward from the fixing body 910. The fixed body 910 may be formed in a rectangular shape, for example. The coupling hook 930 may be provided on at least two facing sides of the fixing body 910.

For example, when two coupling hooks 930 are provided in the fixing body 910, the coupling hooks 930 on each of the pair of short sides or the pair of long sides of the fixing body 910 may be provided in position facing each other. On the other hand, when four coupling hooks 930 are provided in the fixed body 910, the coupling hooks 930 may be provided on each of a pair of short sides and a pair of long sides of the fixed body 910.

The distance between the two coupling hooks 930 disposed on the position facing each other in the fixed body 910 is greater than the diameter of the flange 527 of the first housing 510. Accordingly, interference between the flange 527 and the coupling hook 930 during the relative rotation of the first housing 510 and the first door 21 can be prevented.

The door fixing portion 90 may include an extension wall 920 extending downward from an edge of the fixing body 910.

The extension wall 920 may be provided on the remaining portion of the edge of the fixing body 910 except for the coupling hook 930. The extension wall 920 may be spaced apart from the coupling hook 930 in a horizontal direction.

The extended length of the extension wall 920 is shorter than the extended length of the coupling hook 930.

Meanwhile, the bottom 212 of the recessed portion 210 of the first door 21 may be provided with a seating groove 213 formed by being recessed downward. The depth of the seating groove 213 may be the same as or similar to the height from the upper surface of the fixing body 910 to the lower end of the extension wall 920. Accordingly, the lower end of the extension wall 920 may be seated in the seating groove 213.

The length of the seating groove 213 in the left and right direction (length in the Y-axis direction) and the length thereof in the front and rear direction (length in the X-axis direction) may be the same as or substantially similar to the length of the fixed body 910 in the front and rear direction and the length thereof in the left and right direction. However, the length of the seating groove 213 in the left and right direction may be different from the length thereof in the front and rear direction.

The door opening 214 may be provided in the seating groove 213. In addition, a hook slot 217 through which the coupling hook 930 passes may be provided in the seating groove 213.

The number of hook slots 217 may be the same as the number of coupling hooks 930, and the disposition of the hook slots 217 may correspond to the disposition of the coupling hooks 930.

When the coupling hook 930 passes through the hook slot 217, the hole 912 of the door fixing portion 90 may be aligned with the door opening 214. Of course, when the door fixing portion 90 is coupled to the first door 21 in a state in which the first housing 510 passes through the hole 912 of the door fixing portion 90, the flange 527 may be seated in the seating groove 213, and the inner passage P of the first housing 510 may be aligned with the door opening 214.

The first door 21 may further include a flange guide 215, 216 for limiting the movement of the first housing 510 in the horizontal direction during the relative rotation of the first housing 510 and the first door 21.

Substantially, the flange guides 215 and 216 may guide rotation of the flange 527 of the first housing 510.

For example, a plurality of flange guides 215 and 216 may be spaced apart from each other. FIG. 14 illustrates that the plurality of flange guides 215 and 216 are disposed to be spaced apart in the Y-axis direction, for example. Alternatively, one flange guide may be disposed to surround the flange 527 of the first housing 510 to guide rotation of the flange 527.

The plurality of flange guides 215 and 216 may be symmetrically disposed with respect to the center Cl of the door opening 214. For example, the door opening 214 may be positioned between a pair of flange guides 215 and 216.

The plurality of flange guides 215 and 216 may be formed by protruding upward from the seating groove 213, and an outer surface may be spaced apart from the side wall **213*a* forming the seating groove 213. Accordingly, the hook slot 217 may be located between the outer surfaces of the flange guides 215 and 216 and the side wall 213*a* of the seating groove 213**.

When the coupling hook 930 is coupled to the hook slot 217, the side wall 920 of the door fixing portion 90 can be accommodated between the outer surfaces of the flange guides 215 and 216 and the wall **213*a* of the seating groove 213**.

In order for the plurality of flange guides 215 and 216 to guide rotation of the flange 527 of the first housing 510, surfaces facing each other in the plurality of flange guides 215 and 216 may include rounded surfaces **215*a*, 216*a***.

The rounded surfaces **215*a* and 216*a* may be formed in an arc shape centered on the center Cl of the door opening 214. The radius of the rounded surfaces 215*a* and 216*a* may be the same as or substantially similar to the radius of the flange 527**.

Accordingly, the flange 527 of the first housing 510 may be positioned between the plurality of rounded surfaces **215*a* and 216*a* in the seating groove 213**.

In a state in which the first door 21 is closed, the rotational center C of the first door 21 may be closer to the front surface of the first door 21 than the center Cl of the door opening 214. Since the center Cl of the door opening 214 is spaced apart from the rotational center C of the first door 21, the center Cl of the door opening 214 while the first door 21 is opened may be rotated with respect to the rotational center C of the first door 21.

Figure 16:
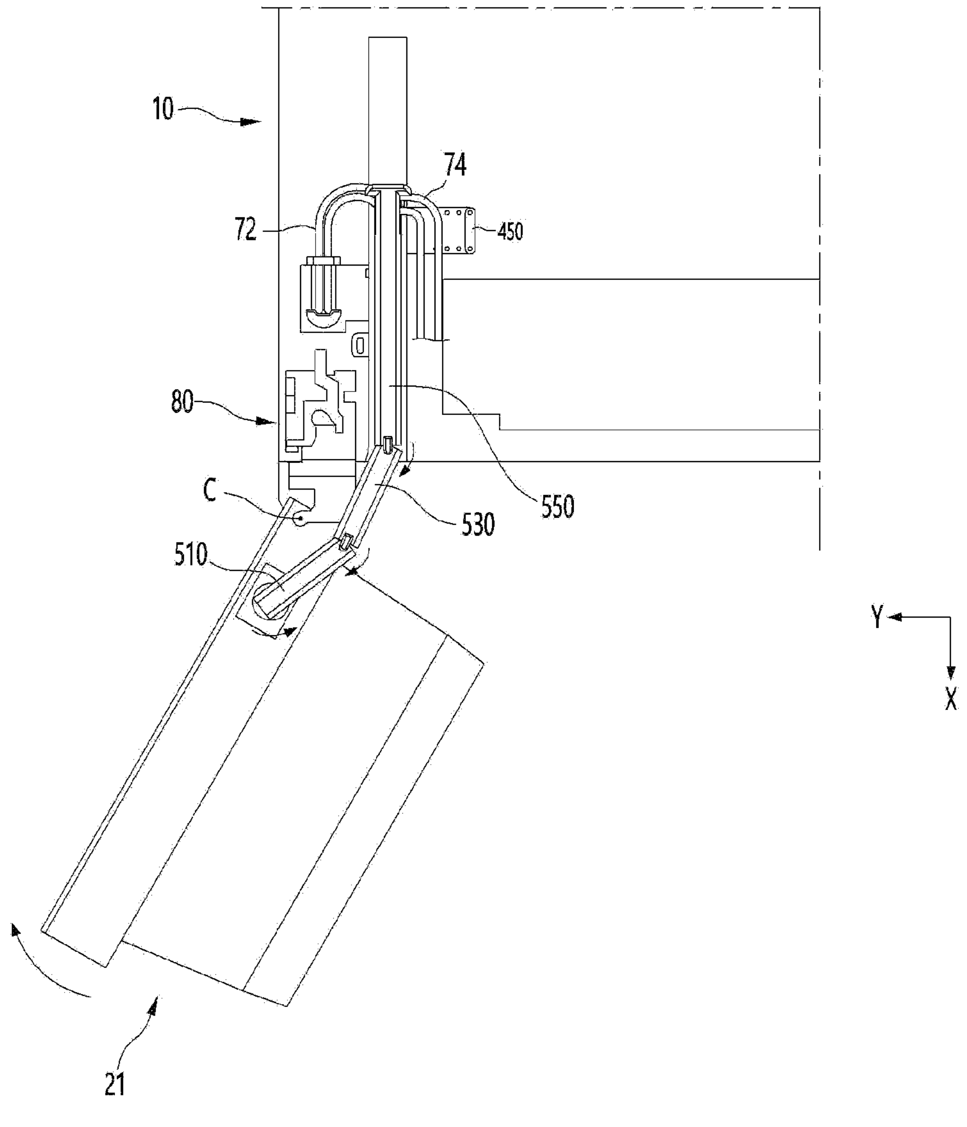
FIG. 16 is a plan view illustrating a state where the first door of the present disclosure is opened by the maximum angle.
Figure 17:
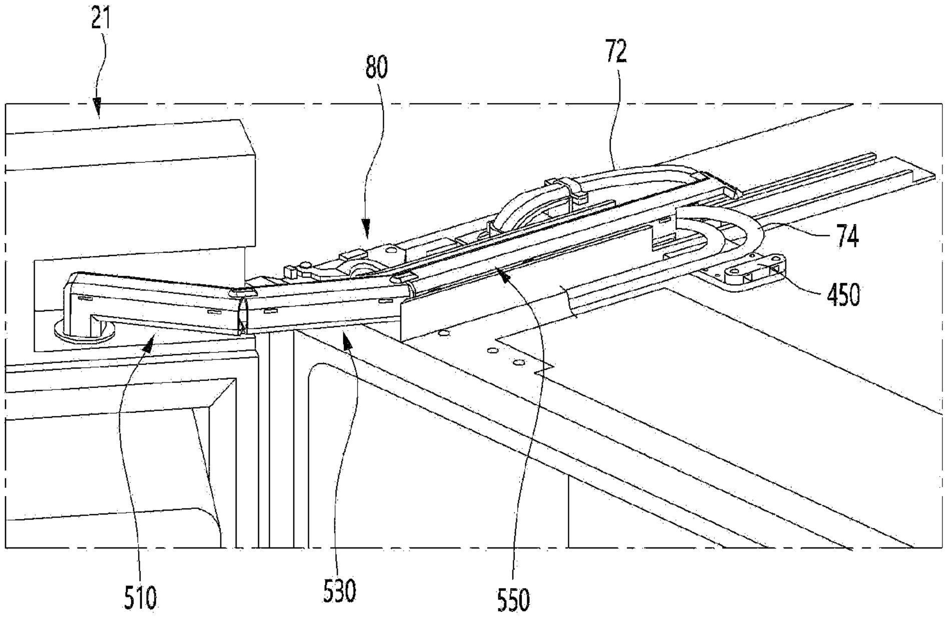
FIG. 17 is a perspective view illustrating a state where the first door of the present disclosure is opened by the maximum angle.

FIG. 16 is a plan view illustrating a state where the first door of the present disclosure is opened by the maximum angle, and FIG. 17 is a perspective view illustrating a state where the first door of the present disclosure is opened by the maximum angle.

Referring to FIGS. 3 to 17, the first door 21 is provided with the above-described door opening 214, and the first housing 510 is rotatably connected to the first door 21 with the door fixing portion 90 at the upper side of the door opening 214.

In this case, the center Cl of the door opening 214 may be the same as or different from the rotational center of the first housing 510. The rotational center of the first housing 510 may pass through the door opening 214. In other words, the rotational center of the first housing 510 may be located within an area formed by the door opening 214.

To open the first door 21, the first door 21 may be rotated in a first direction (clockwise direction in the drawing).

While the first door 21 is opened, the third housing 550 is guided by the cabinet guide 40 and may move in a direction closer to the first door 21.

The third housing 550 may rotate while performing a linear movement in a direction closer to the first door 21.

In the present embodiment, the linear movement means movement in the X-axis direction, for example, and rotational movement means movement in the X-axis and Y-axis directions, for example. The rotation angle means an angle when each housing is rotated in the first direction.

In addition, when the rotation angle of each housing is increased, it means that the movement distance in the X-axis direction is reduced and the movement distance in the Y-axis direction is increased.

While the first door 21 is opened, the second housing 530 may move in a direction closer to the first door 21.

For example, the second housing 530 may perform a rotational movement while performing the linear movement in a direction closer to the first door 21. Alternatively, the second housing 530 may rotate in a direction closer to the first door 21.

While the first door 21 is opened, the first housing 510 may move in a direction closer to the first door 21.

For example, the first housing 510 may rotate while performing the linear movement in a direction closer to the first door 21. As another example, the first housing 510 may rotate in a direction closer to the first door 21.

While the first door 21 is opened, the first housing 510 may be rotated with respect to the first door 21. In addition, the first housing 510 may be rotated with respect to the second housing 530. In addition, the second housing 530 may be rotated with respect to the third housing 550.

While the first door 21 is opened, an angle formed between the first housing 510 and the front surface of the first door 21 may increase.

In a state in which the first door 21 is opened at the maximum angle, the entirety of the first housing 510 may be drawn out of the cabinet guide 40. In addition, the second housing 530 may be drawn out of the cabinet guide 40.

In a state which the first door 21 is opened at the maximum angle, the second housing 530 is located at the side of the hinge apparatus 80.

In this case, since the second housing 530 does not interfere with the hinge apparatus 80 and the second housing 530 covers the side surface of the hinge apparatus 80, exposure of the hinge apparatus 80 to the user may be minimized.

When the first door 21 is opened at the maximum angle, the rotation angle of the first housing 510 with respect to the second housing 530 is greater than the rotation angle of the second housing 530 with respect to the third housing 550.

In the present embodiment, while the first door 21 is opened, portions of the water pipe 72 and the wire 74 may be bent. However, since not only the first housing 510 and the second housing 530 rotate relative to each other, but also the second housing 530 rotates with respect to the third housing 550, there is an advantage in that the radius of curvature of the bent portion of the water pipe 72 and the wire 74 is increased and thus the amount of bending can be reduced.

According to the present embodiment, when the hook of the door fixing portion 90 is coupled to the first door 21 in a state in which the first housing of the guide housing passes through the door fixing portion 90, since the first housing 510 is rotatably connected to the first door 21, there is an advantage in that the connection between the guide housing and the first door 21 is easy.

According to the present embodiment, since the guide housing is rotated with respect to the refrigerator door while the door is opened, the amount of bending of the wire and/or the water pipe can be minimized.

According to the present embodiment, while the rotation of the guide housing connected to the refrigerator door is smooth by the flange guide while the door is opened, movement in the horizontal direction may be restricted.

Figure 18:
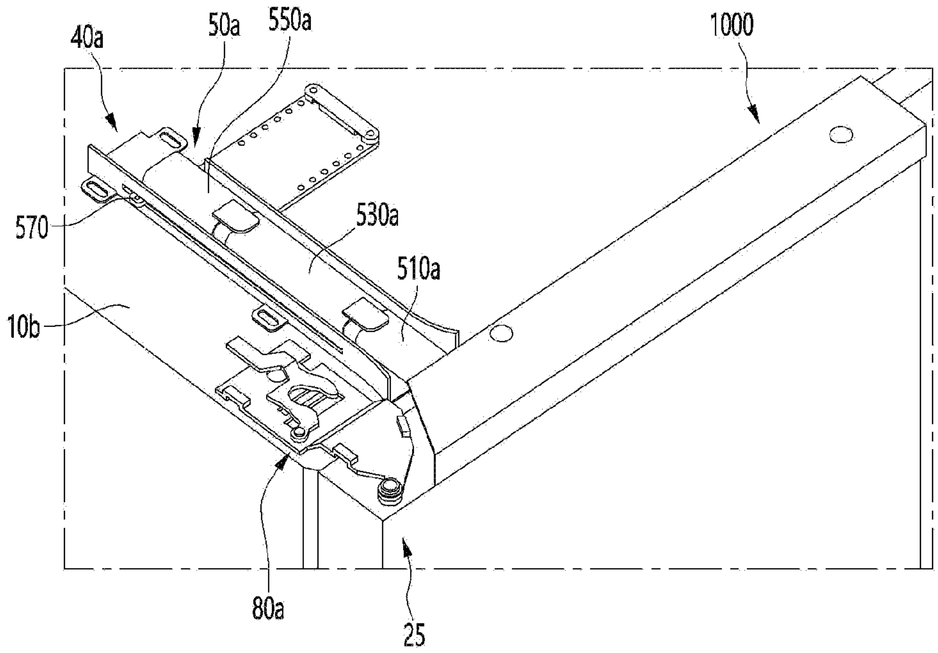
FIG. 18 is a view illustrating a guide unit of a refrigerator according to another embodiment of the present disclosure.
Figure 19:
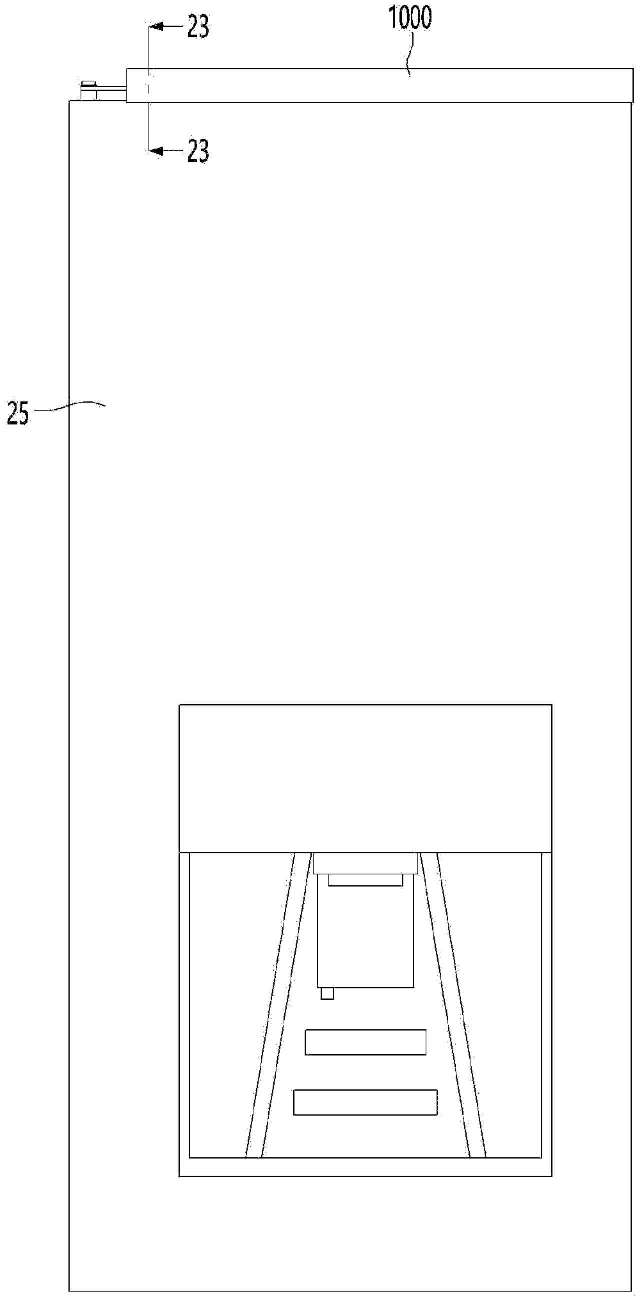
FIG. 19 is a front view illustrating a first door according to another embodiment of the present disclosure.

FIG. 18 is a view illustrating a guide unit of a refrigerator according to another embodiment of the present disclosure, and FIG. 19 is a front view illustrating a first door according to another embodiment of the present disclosure.

In the present embodiment, the basic functions of the guide unit of the previous embodiment are the same, but there is a difference in the form of separate components constituting the guide unit. Therefore, only the characteristic portions of the present embodiment will be described below, and the same configuration as the previous embodiment will use the contents of the previous embodiment.

Referring to FIGS. 18 and 19, the first door 25 of the present embodiment may be rotatably connected to the cabinet 10*b* by a hinge apparatus 80*a*. The hinge apparatus 80*a* may be connected to an upper surface of the first door 25.

The refrigerator of the present embodiment may include a guide unit for guiding the water pipe 72 and/or the wire 74. The guide unit may include a guide housing 50*a*. The guide unit may further include a cabinet guide 40*a*.

The guide housing 50*a* may include first to third housings 510*a*, 530*a*, and 550*a*.

The shape, coupling method, and function of the first to third housings 510*a*, 530*a*, and 550*a* are the same as those of the previous embodiment, so detailed descriptions thereof will be omitted.

The first housing 510*a* may be rotatably connected to the first door 25. For example, the first housing 510*a* may be rotatably connected to the upper surface of the first door 25.

Since the first housing 510*a* has a predetermined height, when the first housing 510*a* is connected to the first door 25, the first housing 510*a* may protrude upwards from the upper surface of the first door 25.

To minimize exposure of the first housing 510*a* from the front of the refrigerator, the refrigerator of the present embodiment may further include a door cover 1000 covering the first housing 510*a*.

The door cover 1000 may be coupled to an upper surface of the first door 25.

Figure 20:
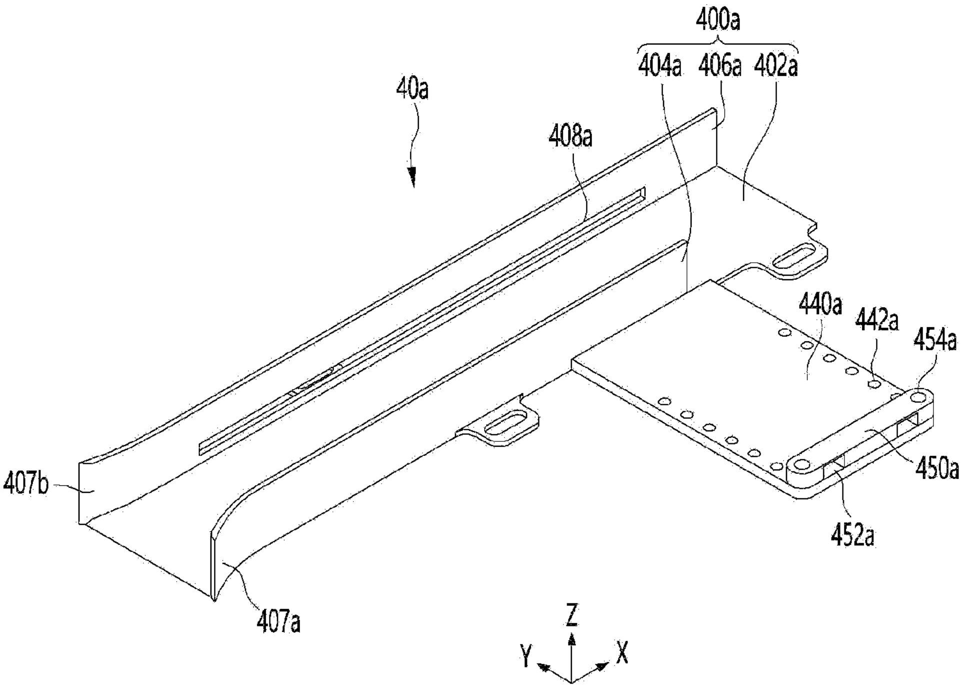
FIG. 20 is a perspective view illustrating a cabinet guide according to another embodiment of the present disclosure.

FIG. 20 is a perspective view illustrating a cabinet guide according to another embodiment of the present disclosure.

Referring to FIG. 20, the cabinet guide 40*a* according to the present embodiment may include a guide body 400*a*.

The guide body 400*a* may be fixed to an upper surface of the cabinet 10*b*.

The guide body 400*a* may include a bottom wall 402*a* and a plurality of side walls 404*a* and 406*a* extending upward from both sides of the bottom wall 402*a*.

The bottom wall 402*a* may be formed long in the longitudinal direction.

The plurality of side walls 404*a* and 406*a* may include a first side wall 404*a* and a second side wall 406*a* spaced apart from the first side wall 404*a*. The second side wall 406*a* may be located on the left side of the first side wall 404*a*. The second side wall 406*a* may be positioned adjacent to the hinge apparatus 80*a*.

The guide housing 50*a* may be positioned in a space between the first side wall 404*a* and the second side wall 406*a*.

In a state in which the first door 25 is closed, the distance between the first side wall 404*a* and the second side wall 406*a* is greater than the width in the left and right direction (width in the Y-axis direction) of the guide housing 50*a*.

The first side wall 404*a* may include a first inclined wall 407*a*. The second side wall 406*a* may include a second inclined wall 407*b*.

For example, each of the inclined walls 407*a* and 470*b* may be disposed adjacent to the first door 25 in a state in which the first door 25 is closed. Therefore, the distance between the first side wall 404*a* and the second side wall 406*a* increases at the side of the inclined walls 407*a* and 407*b* while being constant from the rear side of the cabinet 10*b* toward the first door 25.

At least one of the first side wall 404*a* and the second side wall 406*a* may be provided with a guide slot 408*a* into which a guide rib 570 provided in the guide housing is inserted. FIG. 20 illustrates, for example, that the guide slot 408*a* is provided on the second side wall 406*a*.

The cabinet guide 40*a* may further include a fixing wall 440*a* used to fix the position of the wire 74. The fixing wall 440*a* may extend from the guide body 400*a* in the lateral direction.

A coupling member 450*a* to which a cable tie is coupled may be provided on the fixing wall 440*a*.

A plurality of holes 442*a* may be formed in the X-axis direction and a plurality of holes 442*a* may be formed in the Y-axis direction in the fixing wall 440*a*. The coupling member 450 may be fastened to a first hole among the holes 442*a* arranged in the Y-axis direction and a second hole spaced apart from the first hole in the Z-axis direction by a fastening member.

The coupling member 450*a* may include a plurality of fastening holes 454*a* and one or more slots 452*a* through which the cable tie is coupled. The cable tie may pass through the slot 452*a* and be coupled to surround the coupling member 450*a* and the wire 74.

After the wire 74 is placed between the guide body 400*a* and the coupling member 450*a*, when the wire 74 and the coupling member 450*a* are coupled using the cable tie, the position of the wire 74 can be fixed.

Figure 21:
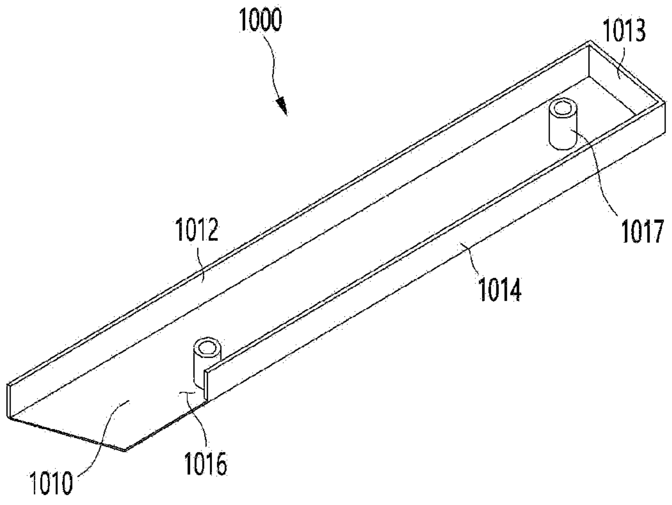
FIG. 21 is a perspective view illustrating a door cover according to another embodiment of the present disclosure.

FIG. 21 is a perspective view illustrating a door cover according to another embodiment of the present disclosure.

Referring to FIG. 21, the door cover 1000 of the present embodiment may include some or all of an upper wall 1010, a front wall 1012, a rear wall 1014 spaced apart from the front wall 1012, and a side wall 1013.

The side walls 1013 may be formed at both ends of the upper wall 1010 at end portions located far from the hinge apparatus 80*a*.

A distance between the front wall 1012 and the rear wall 1014 may be the same as or similar to the thickness of the first door 25 in the front and rear direction.

The length of the rear wall 1014 in the left and right direction may be shorter than the length of the front wall 1012 in the left and right direction. Due to the length difference between the two walls, the door cover 1000 includes a passage 1016 to prevent interference with the first housing 510*a*. In other words, the first housing 510*a* may be positioned in the passage 1016.

The heights of the front wall 1012 and the rear wall 1014 may be equal to or greater than the height of the guide housing 50*a* connected to the first door 25.

The door cover 1000 may further include one or more fastening bosses 1017 extending downward from the upper wall 1010. A fastening member (not illustrated) may pass through the fastening boss 1017 at the upper side of the door cover 1000 and be fastened to the upper surface of the first door 25.

When the door cover 1000 is fastened to the upper surface of the first door 25, the front wall 1012 covers the first housing 510*a* from the front side of the first housing 510*a*. Therefore, exposure of the first housing 510*a* connected to the first door 25 by the door cover 1000 can be minimized.

In a state in which the door cover 1000 is fastened to the first door 25, the side wall 103 of the door cover 1000 may be positioned on the same line as the side wall of the first door 25. In a state in which the door cover 1000 is fastened to the first door 25, the front wall 1012 of the door cover 1000 may be positioned on the same line as the first door 25. In this case, a sense of unity between the door cover 1000 and the first door 25 may be improved.

Figure 22:
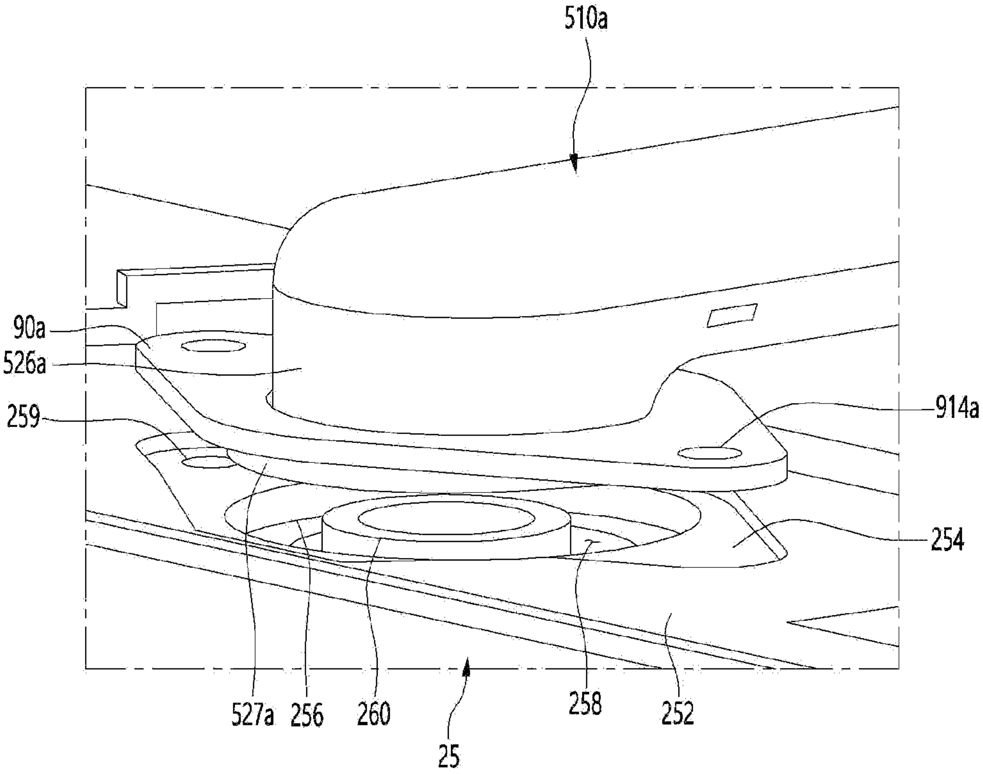
FIG. 22 is a view illustrating a door fixing portion according to another embodiment of the present disclosure.
Figure 23:
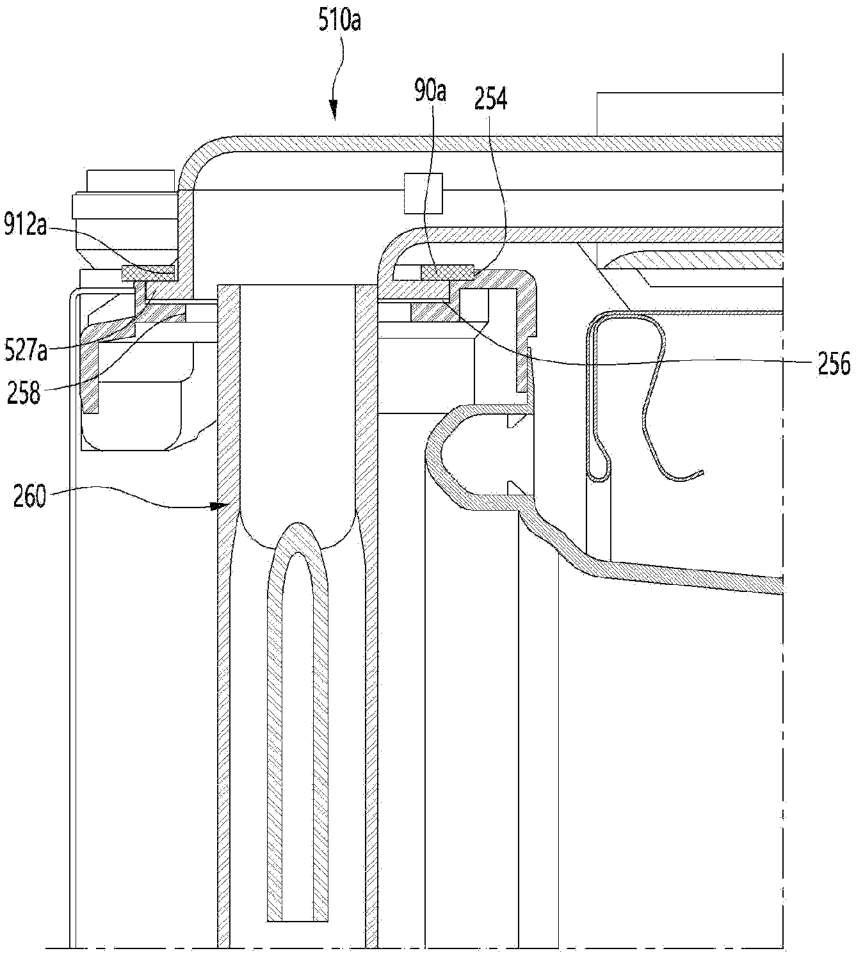
FIG. 23 is a cross-sectional view taken along line 23-23 of FIG. 19.

FIG. 22 is a view illustrating a door fixing portion according to another embodiment of the present disclosure, and FIG. 23 is a cross-sectional view taken along line 23-23 of FIG. 19.

Referring to FIGS. 22 and 23, the first housing 510*a* may be rotatably coupled to the first door 25 by a door fixing portion 90*a*.

The door fixing portion 90*a* may be formed in a plate shape, for example.

A through-hole 912*a* through which the first housing 510*a* passes may be provided in the door fixing portion 90*a*. The first housing 510*a* may include an upper and lower extension portion 526*a* extending in a vertical direction. A flange 527*a* may be provided around the upper and lower extension portions 526*a*. For example, the flange 527*a* may be provided around a lower end of the upper and lower extension portion 526*a*.

A diameter of the through-hole 912*a* may be smaller than a diameter of the flange 527*a* of the first housing 510*a*. A diameter of the through-hole 912*a* may be larger than a maximum width of the first housing 510*a* excluding the flange 527*a*.

The first housing 510*a* may pass through the through-hole 912*a* at the lower side of the door fixing portion 90*a*, and in this state, when the door fixing portion 90*a* is coupled to the first door 25*a*, the flange 527*a* may contact the lower surface of the door fixing portion 90*a*.

The door fixing portion 90*a* may include a fastening hole 914*a* through which a fastening member passes. For example, the door fixing portion 90*a* may include a plurality of fastening holes 914*a* spaced apart from each other. The through-hole 912*a* may be positioned between at least two fastening holes 914*a*.

An upper surface 252 of the first door 25*a* may be provided with a seating groove 254 formed by being recessed downward. The depth of the seating groove 254 may be the same as or similar to the thickness of the door fixing portion 90*a*.

An accommodation groove 256 for accommodating the flange 527*a* may be formed in the seating groove 254. The accommodation groove 256 may be formed by recessing a portion of the seating groove 254 downward. The accommodation groove 256 may be formed in a circular shape and may have a diameter identical to or substantially similar to that of the flange 527*a*. Accordingly, in a state in which the flange 527*a* is seated in the accommodation groove 256, rotation of the flange 527*a* may be guided by the wall forming the accommodation groove 256.

A door opening 258 may be provided in the accommodation groove 256. The water pipe 72 and/or the wire 74 may pass through the door opening 258.

When the flange 527*a* is seated in the accommodation groove 256, the inner passage of the first housing 510*a* may be aligned with the door opening 258.

A fastening portion 259 aligned with the fastening hole 914*a* may be provided in the seating groove 254. The fastening portion 259 may be disposed to correspond to the fastening hole 914*a*. The fastening portion 259 may be a groove or a hole.

The first door 25 may further include a guide tube 260. The guide tube 260 may guide the water pipe 72 and/or the wire 74 within the first door 25. An inlet of the guide tube 260 may be located at the door opening 258.

Alternatively, the inlet of the guide tube 260 may protrude onto the accommodation groove 256 through the door opening 258. In this case, when the flange 527*a* is seated in the accommodation groove 256, the inlet of the guide tube 260 may be located in the first housing 510*a*.

The invention claimed is:

1. A refrigerator comprising:
- a cabinet having a storage space;
- a refrigerator door rotatably connected to the cabinet by a hinge apparatus and configured to open and close the storage space;
- a guide housing configured to guide at least one of a wire or a pipe, through which liquid flows, between the cabinet and the refrigerator door, the at least one of the wire or the pipe entering the refrigerator door through a door opening that is spaced apart from a rotational axis of the refrigerator door, and the guide housing including a plurality of housing segments which are rotatably connected to each other; and
- a door fixing coupling that rotatably connects a first housing segment among the plurality of housing segments to the refrigerator door,
- wherein the first housing segment extends through a hole in the door fixing coupling and includes a flange that is positioned between the door fixing coupling and the door, and
- wherein the refrigerator door includes:
  - a seating groove in which the flange is seated; and
  - a flange guide that guides rotation of the flange and is provided in the seating groove.

2. The refrigerator of claim 1,
wherein the door fixing coupling comprises a fixing wall including the hole, and a first portion of the first housing segment passes through the hole.

3. The refrigerator of claim 2,
wherein the door opening through which the at least one of the wire or the pipe enters the refrigerator door is provided in the seating groove.

4. The refrigerator of claim 3,
wherein a maximum width of the first portion of the first housing segment that passes through the hole is smaller than a diameter of the hole,
wherein a diameter of the flange is greater than the diameter of the hole, and
wherein the flange extends laterally from a second portion of the first housing segment that is separate from the first portion of the first housing segment that passes through the hole.

5. The refrigerator of claim 4,
wherein the first housing segment includes a horizontal extension portion and a vertical extension portion extending from the horizontal extension portion, and
wherein the flange is provided around an end region of the vertical extension portion.

6. The refrigerator of claim 1,
wherein a plurality of the flange guides are positioned in the seating groove and are spaced apart from each other, and
wherein each of the plurality of flange guides includes a rounded surface.

7. The refrigerator of claim 6,
wherein the plurality of flange guides are symmetrically positioned with respect to a center of the door opening through which the at least one of the wire or the pipe enters the refrigerator door.

8. The refrigerator of claim 6,
wherein the door opening through which the at least one of the wire or the pipe enters the refrigerator door is positioned between a pair of the flange guides, and
wherein the rounded surfaces of the pair of flange guides face each other.

9. The refrigerator of claim 2,
wherein the door fixing coupling includes a coupling hook protruding from the fixing wall and coupled to the refrigerator door,
wherein the flange guide is spaced apart from a side wall provided in the refrigerator door and forming the seating groove, and
wherein a hook slot through which the coupling hook passes is provided between the side wall and the flange guide in the seating groove.

10. The refrigerator of claim 9,
wherein the door fixing coupling further includes an extension wall extending downward from an edge of the fixing wall and positioned between the side wall and the flange guide.

11. The refrigerator of claim 3,
wherein the refrigerator door includes a recess extending downward from an upper surface of the refrigerator door, and
wherein the seating groove is recessed downward from a bottom of the recess.

12. The refrigerator of claim 11,
wherein the hinge apparatus is connected to the bottom of the recess.

13. The refrigerator of claim 1,
wherein a distance between a center of the door opening through which the at least one of the wire or the pipe enters the refrigerator door and a front surface of the refrigerator door is greater than a distance between the rotational axis of the refrigerator door and the front surface of the refrigerator door.

14. A refrigerator comprising:
- a cabinet having a storage space;
- a refrigerator door rotatably connected to the cabinet by a hinge apparatus and configured to open and close the storage space;
- a guide housing configured to guide at least one of a wire or a pipe, through which liquid flows, between the cabinet and the refrigerator door, the at least one of the wire or the pipe entering the refrigerator door through a door opening that is spaced apart from a rotational axis of the refrigerator door, and the guide housing including a plurality of housing segments which are rotatably connected to each other; and
- a door fixing coupling that rotatably connects a first housing segment among the plurality of housing segments to the refrigerator door,
- wherein the first housing segment extends through an opening in the door fixing coupling and includes a flange that is positioned between the door fixing coupling and the door, and wherein the refrigerator door includes:

a seating groove in which the door fixing coupling is seated, and an accommodation groove in which the flange is seated and that is provided in the seating groove.

15. The refrigerator of claim 14, wherein the door opening through which the at least one of the wire or the pipe enters the refrigerator door is provided in the accommodation groove.

16. The refrigerator of claim 14, wherein the door fixing coupling includes one or more fastening holes, and wherein the refrigerator door includes one or more fastening openings that are aligned with the one or more fastening holes and are provided in the seating groove.

17. The refrigerator of claim 14, wherein the seating groove is recessed from an upper surface of the refrigerator door.

18. The refrigerator of claim 17, further comprising:

a door cover fastened to an upper surface of the refrigerator door and covering at least a portion of the first housing segment connected to the refrigerator door.

19. The refrigerator of claim 18, wherein the door cover includes a passage through which the first housing segment passes.

* * * * *